(12) United States Patent
Sugimoto et al.

(10) Patent No.: US 11,681,121 B2
(45) Date of Patent: *Jun. 20, 2023

(54) OPTICAL DEVICE

(71) Applicant: HAMAMATSU PHOTONICS K.K., Hamamatsu (JP)

(72) Inventors: Tatsuya Sugimoto, Hamamatsu (JP); Tomofumi Suzuki, Hamamatsu (JP); Kyosuke Kotani, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,023

(22) Filed: Oct. 20, 2021

(65) Prior Publication Data

US 2022/0043237 A1 Feb. 10, 2022

Related U.S. Application Data

(63) Continuation of application No. 16/625,698, filed as application No. PCT/JP2018/025639 on Jul. 6, 2018, now Pat. No. 11,187,872.

(30) Foreign Application Priority Data

Jul. 6, 2017 (JP) .................................. 2017-133093
Dec. 7, 2017 (JP) .................................. 2017-235021
(Continued)

(51) Int. Cl.
*G02B 26/08* (2006.01)
*G02B 7/182* (2021.01)

(52) U.S. Cl.
CPC ......... *G02B 7/182* (2013.01); *G02B 26/0833* (2013.01)

(58) Field of Classification Search
CPC .. G02B 7/182; G02B 26/0833; G02B 26/001; G01J 3/45; B81B 3/0062
(Continued)

(56) References Cited

U.S. PATENT DOCUMENTS 6,507,138 B1 1/2003 Rodgers et al.
7,699,296 B1 4/2010 Knollenberg et al.
(Continued)

FOREIGN PATENT DOCUMENTS

CN 1619351 A 5/2005
CN 1650214 A 8/2005
(Continued)

OTHER PUBLICATIONS

Sandner, Thilo et al. "Out-of-plane translatory MEMS actuator with extraordinary large stroke for optical path length modulation in miniaturized FTIR Spectrometers," SENSOR+TEST Conferences 2011, Proceedings IRS², Jun. 9, 2011, pp. 151-156.
(Continued)

*Primary Examiner* — Euncha P Cherry
(74) *Attorney, Agent, or Firm* — Faegre Drinker Biddle & Reath LLP

(57) ABSTRACT

In an optical device, a movable unit includes a main body portion, a frame portion that surrounds the main body portion with a predetermined interval from the main body portion, and a plurality of connection portions which connect the main body portion and the frame portion to each other. A width of each of the connection portions is larger than an interval between the main body portion and the frame portion, and is smaller than a distance from a connection position with each of the connection portions in the frame portion to any of a connection position with each of
(Continued)

a pair of first torsion support portions and a connection position with each of a pair of second torsion support portions.

17 Claims, 7 Drawing Sheets

(30) Foreign Application Priority Data

| Dec. 7, 2017 | (JP) | 2017-235022 |
| Dec. 7, 2017 | (JP) | 2017-235025 |
| Apr. 19, 2018 | (JP) | 2018-080677 |

(58) Field of Classification Search
USPC ........................................... 359/221.2
See application file for complete search history.

(56) References Cited

U.S. PATENT DOCUMENTS

| 8,353,600 | B1 | 1/2013 | Fu |
| 8,729,770 | B1 | 5/2014 | Milanovic |
| 11,187,872 | B2* | 11/2021 | Sugimoto ............... G02B 7/182 |
| 2002/0109894 | A1 | 8/2002 | Clark et al. |
| 2004/0004775 | A1 | 1/2004 | Turner et al. |
| 2004/0081391 | A1 | 4/2004 | Ko et al. |
| 2004/0232107 | A1 | 11/2004 | Kouma et al. |
| 2005/0099665 | A1 | 5/2005 | Lee et al. |
| 2005/0194650 | A1 | 9/2005 | Hung |
| 2005/0194840 | A1 | 9/2005 | Mori et al. |
| 2006/0082250 | A1 | 4/2006 | Ko et al. |
| 2008/0123242 | A1 | 5/2008 | Zhou |
| 2008/0198249 | A1 | 8/2008 | Tanimura et al. |
| 2008/0247029 | A1 | 10/2008 | Zhou |
| 2008/0284078 | A1 | 11/2008 | Wolter et al. |
| 2009/0107949 | A1 | 4/2009 | Kouma et al. |
| 2009/0109512 | A1 | 4/2009 | Park |
| 2009/0225387 | A1 | 9/2009 | Mizuno et al. |
| 2010/0208347 | A1 | 8/2010 | Kouma et al. |
| 2011/0080627 | A1 | 4/2011 | He et al. |
| 2011/0090551 | A1 | 4/2011 | Pirk et al. |
| 2011/0109194 | A1 | 5/2011 | Hung et al. |
| 2011/0205608 | A1 | 8/2011 | Mizoguchi |
| 2012/0099176 | A1 | 4/2012 | Zhou |
| 2012/0160557 | A1 | 6/2012 | Yamada et al. |
| 2012/0162739 | A1 | 6/2012 | Yamada |
| 2012/0236382 | A1 | 9/2012 | Puegner et al. |
| 2013/0083379 | A1 | 4/2013 | Tanaka et al. |
| 2013/0321892 | A1 | 12/2013 | Haeberle et al. |
| 2014/0125950 | A1 | 5/2014 | Shimada et al. |
| 2014/0137670 | A1 | 5/2014 | Hata et al. |
| 2014/0300942 | A1 | 10/2014 | Van Lierop et al. |
| 2014/0327946 | A1 | 11/2014 | Van Lierop et al. |
| 2014/0355091 | A1 | 12/2014 | Mizutani |
| 2014/0362460 | A1 | 12/2014 | Nozu et al. |
| 2015/0028698 | A1 | 1/2015 | Gutierrez |
| 2015/0234176 | A1 | 8/2015 | Zhou |
| 2016/0216508 | A1 | 7/2016 | Tamamori |
| 2017/0139200 | A1 | 5/2017 | Chang et al. |

FOREIGN PATENT DOCUMENTS

| CN | 1790181 A | 6/2006 |
| CN | 1837892 A | 9/2006 |
| CN | 101246258 A | 8/2008 |
| CN | 101279708 A | 10/2008 |
| CN | 101284642 A | 10/2008 |
| CN | 101290395 A | 10/2008 |
| CN | 101316789 A | 12/2008 |
| CN | 101410744 A | 4/2009 |
| CN | 101786592 A | 7/2010 |
| CN | 101894711 A | 11/2010 |
| CN | 102177465 A | 9/2011 |
| CN | 102265033 A | 11/2011 |
| CN | 102369153 A | 3/2012 |
| CN | 102667497 A | 9/2012 |
| CN | 102868383 A | 1/2013 |
| CN | 103288034 A | 9/2013 |
| CN | 103803478 A | 5/2014 |
| CN | 203825034 U | 9/2014 |
| CN | 104216109 A | 12/2014 |
| CN | 104272167 A | 1/2015 |
| CN | 104348326 A | 2/2015 |
| CN | 104964678 A | 10/2015 |
| CN | 105453408 A | 3/2016 |
| CN | 105492879 A | 4/2016 |
| CN | 105594114 A | 5/2016 |
| CN | 105826252 A | 8/2016 |
| CN | 105899995 A | 8/2016 |
| CN | 106500682 A | 3/2017 |
| CN | 106597016 A | 4/2017 |
| CN | 106604887 A | 4/2017 |
| CN | 106707415 A | 5/2017 |
| EP | 1677086 A1 | 7/2006 |
| EP | 3015901 A1 | 5/2016 |
| EP | 3070508 A1 | 9/2016 |
| JP | H8-506857 A | 7/1996 |
| JP | 2000-214407 A | 8/2000 |
| JP | 2002-524271 A | 8/2002 |
| JP | 2002-326197 A | 11/2002 |
| JP | 2003-029178 A | 1/2003 |
| JP | 2004-177543 A | 6/2004 |
| JP | 2004-215534 A | 8/2004 |
| JP | 2004-325578 A | 11/2004 |
| JP | 2005-010453 A | 1/2005 |
| JP | 2005-275198 A | 10/2005 |
| JP | 2006-343481 A | 12/2006 |
| JP | 2007-155965 A | 6/2007 |
| JP | 2007-183400 A | 7/2007 |
| JP | 2007-188073 A | 7/2007 |
| JP | 2008-055516 A | 3/2008 |
| JP | 2008-083122 A | 4/2008 |
| JP | 2009-171394 A | 7/2009 |
| JP | 2010-008611 A | 1/2010 |
| JP | 2010-029976 A | 2/2010 |
| JP | 2010-054944 A | 3/2010 |
| JP | 2010-085506 A | 4/2010 |
| JP | 2010-128116 A | 6/2010 |
| JP | 2010-184334 A | 8/2010 |
| JP | 2011-069954 A | 4/2011 |
| JP | 2011-175044 A | 9/2011 |
| JP | 2012-042666 A | 3/2012 |
| JP | 2012-133242 A | 7/2012 |
| JP | 2012-184962 A | 9/2012 |
| JP | 2012-524295 A | 10/2012 |
| JP | 2012-528343 A | 11/2012 |
| JP | 2013-009447 A | 1/2013 |
| JP | 2013-016651 A | 1/2013 |
| JP | 2013-148707 A | 8/2013 |
| JP | 2014-006418 A | 1/2014 |
| JP | 2014-023207 A | 2/2014 |
| JP | 2014-035429 A | 2/2014 |
| JP | 2014-115267 A | 6/2014 |
| JP | 2014-215534 A | 11/2014 |
| JP | 2014-235260 A | 12/2014 |
| JP | 2014-238581 A | 12/2014 |
| JP | 2015-093340 A | 5/2015 |
| JP | 2015-102483 A | 6/2015 |
| JP | 2015-219516 A | 12/2015 |
| JP | 2016-085299 A | 5/2016 |
| JP | 2016-114798 A | 6/2016 |
| JP | 2016-151681 A | 8/2016 |
| JP | 2016-200834 A | 12/2016 |
| JP | 2016-212221 A | 12/2016 |
| JP | 2017-058418 A | 3/2017 |
| JP | 2017-070163 A | 4/2017 |
| JP | 2017-129783 A | 7/2017 |
| TW | 201531709 A | 8/2015 |
| TW | I563290 B | 12/2016 |
| TW | 201717371 A | 5/2017 |
| TW | 201718896 A | 6/2017 |
| TW | I588533 B | 6/2017 |
| WO | WO 94/018697 A1 | 8/1994 |

(56) References Cited

FOREIGN PATENT DOCUMENTS

| WO | WO-00/013210 A2 | 3/2000 |
| WO | WO-00/024635 A1 | 5/2000 |
| WO | WO 2009/124607 A1 | 10/2009 |
| WO | WO-2010/121185 A1 | 10/2010 |
| WO | WO 2011/091012 A2 | 7/2011 |
| WO | WO-2013/046612 A1 | 4/2013 |
| WO | WO 2015/068400 A1 | 5/2015 |
| WO | WO 2016/002453 A1 | 1/2016 |

OTHER PUBLICATIONS

International Preliminary Report on Patentability dated Jan. 16, 2020 for PCT/JP2018/025639.

International Preliminary Report on Patentability dated Jan. 16, 2020 for PCT/JP2018/025635.

International Preliminary Report on Patentability dated Jan. 16, 2020 for PCT/JP2018/025637.

International Preliminary Report on Patentability dated Jan. 16, 2020 for PCT/JP2018/025640.

International Preliminary Report on Patentability dated Jan. 16, 2020 for PCT/JP2018/025634.

International Preliminary Report on Patentability dated Jan. 16, 2020 for PCT/JP2018/025636.

International Preliminary Report on Patentability dated Jan. 16, 2020 forPCT/JP2018/025638.

Sandner Thilo et al., "Translatory MEMS actuator and their system integration for miniaturized Fourier transform spectrometers", MOEMS and Miniaturized Systems XI, SPIE, 1000 20th St. Bellingham WA 98225-6705 USA, vol. 8252, No. 1, Mar. 8, 2012, p. 1-p. 10, XP060023646.

English-language translation of International Preliminary Report on Patentability (IPRP) dated May 28, 2020 that issued in WO Patent Application No. PCT/JP2018/032760.

International Preliminary Report on Patentability dated May 28, 2020 for PCT/JP2018/029117.

Akin Aydemir et al., "A new design and a fabrication approach to realize a high performance three axes capacitive MEMS accelerometer", Sensors and Actuators A Physical, vol. 244, Jun. 15, 2016, p. 324-p. 333.

Sun Fengming et al., "MEMS Based Micro Displacement Sensor and Its Application", Chinese Journal of Sensors and Actuators, vol. 26, No. 2, Feb. 2013, p. 293-p. 296.

Anonymous, "Michelson Interferometer—Definition and Applications", URL:https://www.azooptics.com/Article.aspx?ArticleID=698, May 6, 2014, XP093017159.

\* cited by examiner

Fig.1

OPTICAL DEVICE

TECHNICAL FIELD

The present disclosure relates to an optical device that is constituted, for example, as a micro electro mechanical systems (MEMS) device.

BACKGROUND ART

As the MEMS device, an optical device including a base, a movable unit including an optical function unit, and a pair of elastic support units that are connected between the base and the movable unit and supports the movable unit so that the movable unit is movable along a movement direction is known (for example, refer to Patent Literature 1). In the optical device, each of the pair of elastic support units may include a pair of torsion support portions connected to the movable unit.

CITATION LIST

Patent Literature

Patent Literature 1: US Unexamined Patent Publication No. 2008/0284078

SUMMARY OF INVENTION

Technical Problem

In the above-described optical device, because a plurality of torsion support portions are connected to the movable unit, distortion is likely to occur in the movable unit due to a sectional force form the torsion support portions during movement of the movable unit along a movement direction. There is a concern that the distortion of the movable unit may deteriorate optical characteristics, and thus suppression of the distortion is required. In addition, in the above-described optical device, securement of reliability is required.

An object of an aspect of the present disclosure is to provide an optical device capable of securing reliability while suppressing distortion of a movable unit.

Solution to Problem

According to an aspect of the present disclosure, there is provided an optical device including: a base that includes a main surface; a movable unit that includes an optical function unit; and a first elastic support unit and a second elastic support unit that are connected between the base and the movable unit, and support the movable unit so that the movable unit is movable along a predetermined direction perpendicular to the main surface. The movable unit includes a main body portion, a frame portion that surrounds the main body portion with a predetermined interval from the main body portion when viewed from the predetermined direction, and a plurality of connection portions which connect the main body portion and the frame portion to each other, the first elastic support unit includes a pair of first torsion support portions connected to the frame portion, the second elastic support unit includes a pair of second torsion support portions connected to the frame portion, the main body portion includes a central portion provided with the optical function unit, and an outer edge portion, the outer edge portion includes a first rib portion that is formed so that the thickness of the outer edge portion in the predetermined direction is larger than the thickness of the central portion in the predetermined direction, the frame portion includes a second rib portion that is formed so that the thickness of the frame portion in the predetermined direction is larger than the thickness of the central portion in the predetermined direction, and a width of each of the plurality of connection portions is larger than the interval, and is smaller than a distance from a connection position with each of the plurality of connection portions in the frame portion to any of a connection position with each of the pair of first torsion support portions and a connection position with each of the pair of second torsion support portions.

In the optical device, the movable unit includes the main body portion, the frame portion that surrounds the main body portion with a predetermined interval from the main body portion when viewed from the predetermined direction, and the plurality of connection portions which connect the main body portion and the frame portion to each other. Accordingly, a sectional force from the pair of first torsion support portions and the pair of second torsion support portions is less likely to be transmitted to the main body portion, and thus it is possible to suppress distortion of the main body portion. In addition, because the first rib portion is formed, the thickness of the outer edge portion in the predetermined direction is larger than the thickness of the central portion in the predetermined direction. Accordingly, it is possible to more reliably suppress distortion of the main body portion. In addition, because the second rib portion is formed, the thickness of the frame portion in the predetermined direction is larger than the thickness of the central portion in the predetermined direction. Accordingly, it is possible to suppress distortion of the frame portion, and it is possible to suppress distortion of the main body portion which is caused by the distortion of the frame portion. In addition, in the optical device, the width of each of the plurality of connection portions is smaller than the distance from the connection position with each of the plurality of connection portions in the frame portion to any of the connection position with each of the pair of first torsion support portions and the connection position with each of the pair of second torsion support portions. Accordingly, it is possible to secure a distance from the connection position with each of the plurality of connection portions in the frame portion to the connection position with each of the pair of first torsion support portions and the connection position with each of the pair of second torsion support portions. As a result, the sectional force from the pair of first torsion support portions and the pair of second torsion support portions is further less likely to be transmitted to the main body portion, and thus it is possible to more reliably suppress distortion of the main body portion. In addition, in the optical device, the width of each of the plurality of connection portions is larger than the interval between the main body portion and the frame portion. Accordingly, it is possible to secure the strength of the connection portions, and thus even in a case where distortion of the main body portion is suppressed by connecting the main body portion and the frame portion with the connection portions, it is possible to secure the reliability. As described above, according to the optical device, it is possible to secure the reliability while suppressing distortion of the movable unit.

In the optical device according to the aspect of the present disclosure, in the frame portion, the connection position with each of the plurality of connection portions may be located between the connection position with each of the pair of first torsion support portions and the connection position with each of the pair of second torsion support portions. According to this configuration, it is also possible to secure the reliability while suppressing distortion of the movable unit.

In the optical device according to the aspect of the present disclosure, in the frame portion, the connection position with each of the plurality of connection portions may be located between the connection positions with the pair of first torsion support portions, or between the connection positions with the pair of second torsion support portions. According to this configuration, it is also possible to secure the reliability while suppressing distortion of the movable unit.

In the optical device according to the aspect of the present disclosure, the plurality of connection portions may be disposed in a point symmetry with respect to the center of the main body portion when viewed from the predetermined direction. In this case, it is possible to improve balance of the movable unit, and it is possible to more reliably suppress distortion of the main body portion.

In the optical device according to the aspect of the present disclosure, the width of each of the plurality of connection portions may be less than ⅓ times the distance from the connection position with each of the plurality of connection portions in the frame portion to any of the connection position with each of the pair of first torsion support portions and the connection position with each of the pair of second torsion support portions. In this case, the sectional force from the pair of first torsion support portions and the pair of second torsion support portions is further less likely to be transmitted to the main body portion, and thus it is possible to more reliably suppress distortion of the main body portion.

In the optical device according to the aspect of the present disclosure, the width of each of the plurality of connection portions may be smaller than a distance from an inner edge of the first rib portion to an outer edge of the frame portion when viewed from the predetermined direction. In this case, the sectional force from the pair of first torsion support portions and the pair of second torsion support portions is further less likely to be transmitted to the main body portion, and thus it is possible to more reliably suppress distortion of the main body portion.

In the optical device according to the aspect of the present disclosure, the main body portion and the optical function unit may have a circular shape when viewed from the predetermined direction, and each of the plurality of connection portions may be provided not to intersect a straight line that is perpendicular to a straight line that passes through the center of the connection portion and the center of the main body portion and is in contact with an outer edge of the optical function unit when viewed from the predetermined direction. In this case, the sectional force from the pair of first torsion support portions and the pair of second torsion support portions is further less likely to be transmitted to the main body portion, and thus it is possible to more reliably suppress distortion of the main body portion.

In the optical device according to the aspect of the present disclosure, each of the plurality of connection portions may include a third rib portion that is formed so that the thickness of each of the plurality of connection portions in the predetermined direction is larger than the thickness of the central portion in the predetermined direction, and the third rib portion may be connected to the first rib portion and the second rib portion. In this case, it is possible to suppress distortion of the connection portion, and it is possible to suppress distortion of the main body portion which is caused by the distortion of the connection portion.

In the optical device according to the aspect of the present disclosure, each of the pair of first torsion support portions and each of the pair of second torsion support portions may extend along a second direction that is perpendicular to the predetermined direction, and when viewed from the predetermined direction, any of an angle made by a straight line that passes through a connection position between the frame portion and one of the pair of first torsion support portions and the center of the main body portion, and an axial line that is perpendicular to the second direction and passes through the center of the main body portion, an angle made by a straight line that passes through a connection position between the frame portion and the other of the pair of first torsion support portions and the center of the main body portion, and the axial line, an angle made by a straight line that passes through a connection position between the frame portion and one of the pair of second torsion support portions and the center of the main body portion, and the axial line, and an angle made by a straight line that passes through a connection position between the frame portion and the other of the pair of second torsion support portions and the center of the main body portion, and the axial line may be 60° or less. In this case, it is possible to secure the distance from the connection position with each of the plurality of connection portions in the frame portion to the connection position with each of the pair of first torsion support portions and the connection position with each of the pair of second torsion support portions to be large. As a result, the sectional force from the pair of first torsion support portions and the pair of second torsion support portions is further less likely to be transmitted to the main body portion, and thus it is possible to more reliably suppress distortion of the main body portion.

In the optical device according to the aspect of the present disclosure, each of the pair of first torsion support portions and each of the pair of second torsion support portions may extend along a second direction that is perpendicular to the predetermined direction, and when viewed from the predetermined direction, any of an angle made by a straight line that passes through a connection position between the frame portion and one of the pair of first torsion support portions and the center of the main body portion, and an axial line that is perpendicular to the second direction and passes through the center of the main body portion, an angle made by a straight line that passes through a connection position between the frame portion and the other of the pair of first torsion support portions and the center of the main body portion, and the axial line, an angle made by a straight line that passes through a connection position between the frame portion and one of the pair of second torsion support portions and the center of the main body portion, and the axial line, and an angle made by a straight line that passes through a connection position between the frame portion and the other of the pair of second torsion support portions and the center of the main body portion, and the axial line may be 30° to 70°. In this case, it is possible to secure the distance from the connection position with the base in the first elastic support unit and the second elastic support unit to the connection position with the movable unit while securing the distance from the connection position with each of the plurality of connection portions in the frame portion to the connection position with each of the pair of first torsion support portions and the connection position with each of the pair of second torsion support portions. As a result, it is possible to realize an increase in movement amount of the movable unit in the predetermined direction while suppressing distortion of the main body portion.

In the optical device according to the aspect of the present disclosure, the first elastic support unit may further include a pair of first levers which are respectively connected to the pair of first torsion support portions, and a pair of third torsion support portions which are respectively connected between the pair of first levers and the base, and the second elastic support unit may further include a pair of second levers which are respectively connected to the pair of second torsion support portions, and a pair of fourth torsion support portions which are respectively connected between the pair of second levers and the base. According to this configuration, it is also possible to secure the reliability while suppressing distortion of the movable unit.

Advantageous Effects of Invention

According to the aspect of the present disclosure, it is possible to provide an optical device capable of securing reliability while suppressing distortion of a movable unit.

BRIEF DESCRIPTION OF DRAWINGS

FIG. 1 is a vertical cross-sectional view of an optical module including an optical device according to an embodiment.

DESCRIPTION OF EMBODIMENTS

Figure 2:
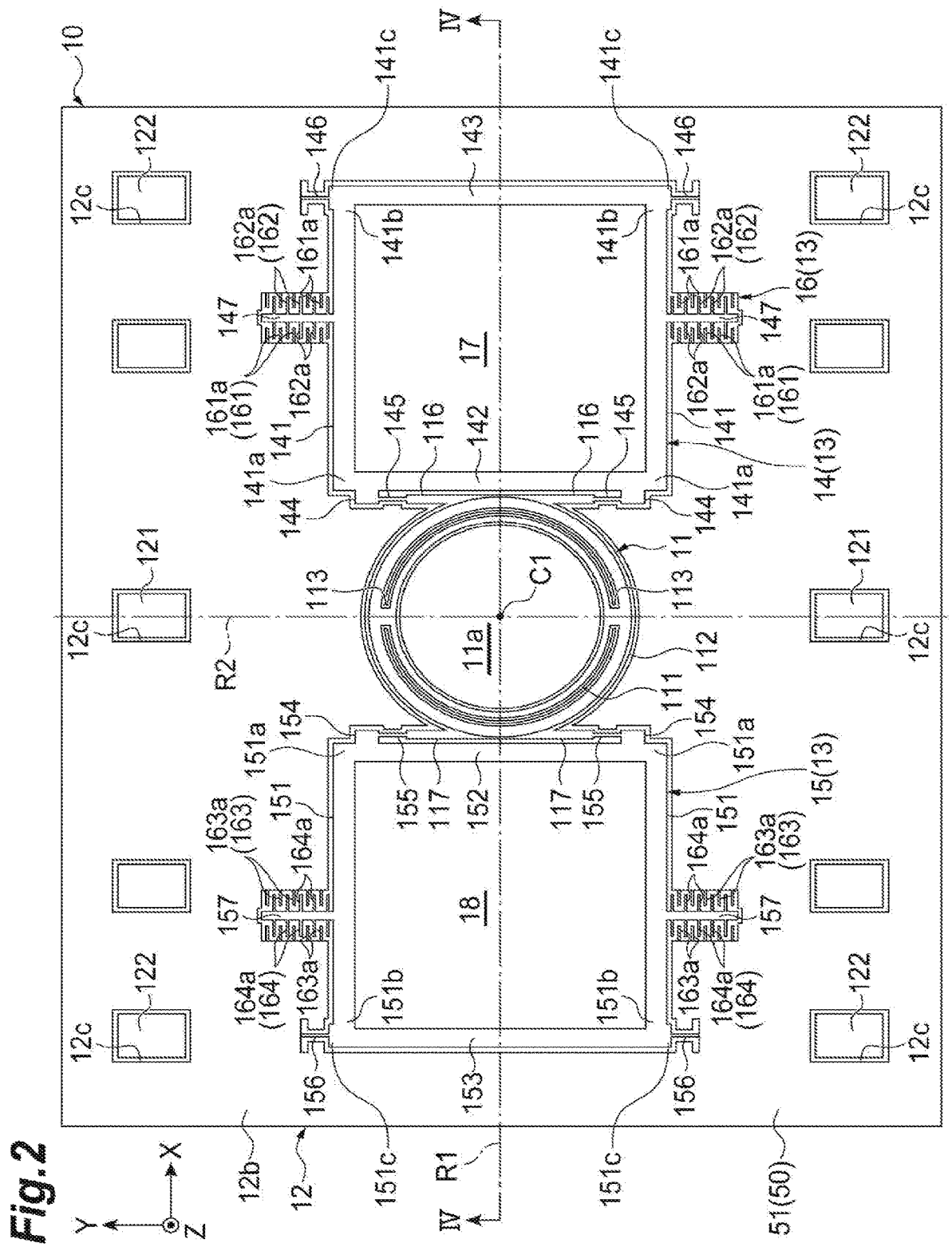
FIG. 2 is a plan view of the optical device illustrated in FIG. 1.

Hereinafter, an embodiment according to an aspect of the present disclosure will be described in detail with reference to the accompanying drawings. In the following description, the same reference numeral will be given to the same or equivalent parts in the respective drawings, and redundant description thereof will be omitted.

[Configuration of Optical Module]

Figure 1:
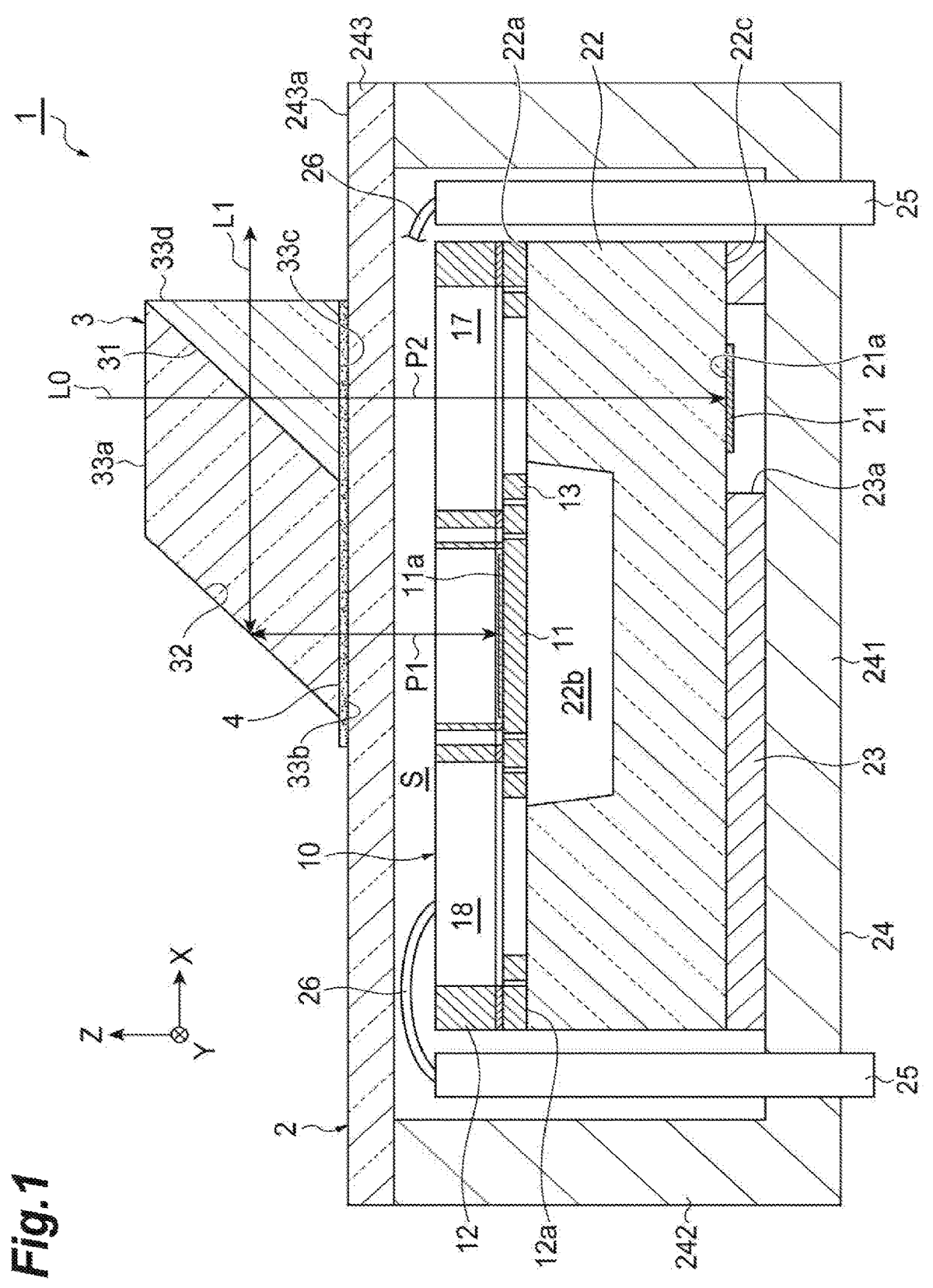

As illustrated in FIG. 1, an optical module 1 includes a mirror unit 2 and a beam splitter unit 3. The mirror unit 2 includes an optical device 10 and a fixed mirror 21. The optical device 10 includes a movable mirror (movable unit) 11. In the optical module 1, an interference optical system is constituted by the beam splitter unit 3, the movable mirror 11, and the fixed mirror 21 with respect to measurement light L0. Here, the interference optical system is a Michelson interference optical system.

The optical device 10 includes a base 12, a drive unit 13, a first optical function unit 17, and a second optical function unit 18 in addition to the movable mirror 11. The base 12 includes a main surface 12a. The movable mirror 11 includes a mirror surface (optical function unit) 11a along a plane parallel to the main surface 12a. The movable mirror 11 is supported in the base 12 to be movable along a Z-axis direction (a direction parallel to a Z-axis, a predetermined direction) perpendicular to the main surface 12a. The drive unit 13 moves the movable mirror 11 along the Z-axis direction. The first optical function unit 17 is disposed on one side of the movable mirror 11 in an X-axis direction (a direction parallel to an X-axis, a third direction) perpendicular to the Z-axis direction when viewed from the Z-axis direction. The second optical function unit 18 is disposed on the other side of the movable mirror 11 in the X-axis direction when viewed from the Z-axis direction. The first optical function unit 17 and the second optical function unit 18 are light passage openings provided in the base 12, and are respectively opened to one side and the other side in the Z-axis direction. In the optical module 1, the second optical function unit 18 is not used as the light passage opening. In a case where the optical device 10 is applied to another device, at least one of the first optical function unit 17 and the second optical function unit 18 may be used as an optical function unit, or both the first optical function unit 17 and the second optical function unit 18 may not be used as the optical function unit.

The fixed mirror 21 includes a mirror surface 21a that extends along a plane (plane perpendicular to the Z-axis direction) parallel to the main surface 12a. A position of the fixed mirror 21 with respect to the base 12 is fixed. In the mirror unit 2, the mirror surface 11a of the movable mirror 11 and the mirror surface 21a of the fixed mirror 21 face one side (the beam splitter unit 3 side) in the Z-axis direction.

The mirror unit 2 includes a support 22, a sub-mount 23, and a package 24 in addition to the optical device 10 and the fixed mirror 21. The package 24 accommodates the optical device 10, the fixed mirror 21, the support 22, and the sub-mount 23. The package 24 includes a bottom wall 241, a side wall 242, and a ceiling wall 243. For example, the package 24 is formed in a rectangular parallelepiped box shape. For example, the package 24 has a size of approximately 30×25×10 (thickness) mm. The bottom wall 241 and the side wall 242 are integrally formed. The ceiling wall 243 faces the bottom wall 241 in the Z-axis direction, and is fixed to the side wall 242. The ceiling wall 243 has optical transparency with respect to the measurement light L0. In the mirror unit 2, a space S is formed by the package 24. For example, the space S is opened to the outside of the mirror unit 2 through a ventilation hole or a gap that is formed in the package 24. In a case where the space S is not an air-tight space as described above, it is possible to suppress contamination, hazing, or the like of the mirror surface 11a which is caused by an out-gas from a resin material that exists in the package 24, a moisture that exists in the package 24, or the like. The space S may be an air-tight space in which the degree of vacuum is maintained to be high, or an air-tight space filled with an inert gas such as nitrogen.

A support 22 is fixed to an inner surface of the bottom wall 241 through the sub-mount 23. For example, the support 22 is formed in a rectangular plate shape. The support 22 has optical transparency with respect to the measurement light L0. The base 12 of the optical device 10 is fixed to a surface 22a of the support 22 on a side opposite to the sub-mount 23. That is, the base 12 is supported by the support 22. A concave portion 22b is formed in the surface 22a of the support 22, and a gap (a part of the space S) is formed between the optical device 10 and the ceiling wall 243. Accordingly, when the movable mirror 11 is caused to move along the Z-axis direction, the movable mirror 11 and the drive unit 13 are prevented from coming into contact with the support 22 and the ceiling wall 243.

An opening 23a is formed in the sub-mount 23. The fixed mirror 21 is disposed on a surface 22c of the support 22 on the sub-mount 23 side to be located in the opening 23a. That is, the fixed mirror 21 is disposed on the surface 22c of the support 22 on a side opposite to the base 12. The fixed mirror 21 is disposed on one side of the movable mirror 11 in the X-axis direction when viewed from the Z-axis direction. The fixed mirror 21 overlaps the first optical function unit 17 of the optical device 10 when viewed from the Z-axis direction.

The mirror unit 2 further includes a plurality of lead pins 25 and a plurality of wires 26. The lead pins 25 are fixed to the bottom wall 241 in a state of penetrating the bottom wall 241. The lead pins 25 are electrically connected to the drive unit 13 through the wires 26. In the mirror unit 2, an electric signal for moving the movable mirror 11 along the Z-axis direction is applied to the drive unit 13 through the plurality of lead pins 25 and the plurality of wires 26.

The beam splitter unit 3 is supported by the ceiling wall 243 of the package 24. Specifically, the beam splitter unit 3 is fixed to a surface 243a of the ceiling wall 243 on a side opposite to the optical device 10 by an optical resin 4. The optical resin 4 has optical transparency with respect to the measurement light L0.

The beam splitter unit 3 includes, a half mirror surface 31, a total reflection mirror surface 32 and a plurality of optical surfaces 33a, 33b, 33c, and 33d. The beam splitter unit 3 is constituted by joining a plurality of optical blocks. For example, the half mirror surface 31 is formed by a dielectric multi-layer film. For example, the total reflection mirror surface 32 is formed by a metal film.

For example, the optical surface 33a is a surface that is perpendicular to the Z-axis direction, and overlaps the first optical function unit 17 of the optical device 10 and the mirror surface 21a of the fixed mirror 21 when viewed from the Z-axis direction. The optical surface 33a allows the measurement light L0 incident along the Z-axis direction to be transmitted therethrough.

For example, the half mirror surface 31 is a surface that is inclined at an angle of 45° with respect to the optical surface 33a, and overlaps the first optical function unit 17 of the optical device 10 and the mirror surface 21a of the fixed mirror 21 when viewed from the Z-axis direction. The half mirror surface 31 reflects a part of the measurement light L0, which is incident to the optical surface 33a along the Z-axis direction, along the X-axis direction, and allows the remainder of the measurement light L0 to be transmitted therethrough toward the fixed mirror 21 side along the Z-axis direction.

The total reflection mirror surface 32 is a surface that is parallel to the half mirror surface 31, overlaps the mirror surface 11a of the movable mirror 11 when viewed from the Z-axis direction, and overlaps the half mirror surface 31 when viewed from the X-axis direction. The total reflection mirror surface 32 reflects the part of the measurement light L0 which is reflected by the half mirror surface 31 toward the movable mirror 11 side along the Z-axis direction.

The optical surface 33b is a surface that is parallel to the optical surface 33a, and overlaps the mirror surface 11a of the movable mirror 11 when viewed from the Z-axis direction. The optical surface 33b allows the part of the measurement light L0 which is reflected by the total reflection mirror surface 32 to be transmitted therethrough toward the movable mirror 11 side along the Z-axis direction.

The optical surface 33c is a surface that is parallel to the optical surface 33a, and overlaps the mirror surface 21a of the fixed mirror 21 when viewed from the Z-axis direction. The optical surface 33c allows the remainder of the measurement light L0 which is transmitted through the half mirror surface 31 to be transmitted therethrough toward the fixed mirror 21 side along the Z-axis direction.

For example, the optical surface 33d is a surface that is perpendicular to the X-axis direction, and overlaps the half mirror surface 31 and the total reflection mirror surface 32 when viewed from the X-axis direction. The optical surface 33d allows measurement light L1 to be transmitted therethrough along the X-axis direction. The measurement light L1 is interference light of the part of the measurement light L0 which is sequentially reflected by the mirror surface 11a of the movable mirror 11 and the total reflection mirror surface 32 and is transmitted through the half mirror surface 31, and the remainder of the measurement light L0 which is sequentially reflected by the mirror surface 21a of the fixed mirror 21 and the half mirror surface 31.

In the optical module 1 constituted as described above, when the measurement light L0 is incident to the beam splitter unit 3 from the outside of the optical module 1 through the optical surface 33a, a part of the measurement light L0 is sequentially reflected by the half mirror surface 31 and the total reflection mirror surface 32, and proceeds through the mirror surface 11a of the movable mirror 11. In addition, the part of the measurement light L0 is reflected by the mirror surface 11a of the movable mirror 11, proceeds on the same optical path (an optical path P1 to be described later) in an opposite direction, and is transmitted through the half mirror surface 31 of the beam splitter unit 3.

On the other hand, the remainder of the measurement light L0 is transmitted through the half mirror surface 31 of the beam splitter unit 3, passes through the first optical function unit 17, is transmitted through the support 22, and proceeds toward the mirror surface 21a of the fixed mirror 21. In addition, the remainder of the measurement light L0 is reflected by the mirror surface 21a of the fixed mirror 21, proceeds on the same optical path (an optical path P2 to be described later) in an opposite direction, and is reflected by the half mirror surface 31 of the beam splitter unit 3.

The part of the measurement light L0 which is transmitted through the half mirror surface 31 of the beam splitter unit 3, and the remainder of the measurement light L0 which is reflected by the half mirror surface 31 of the beam splitter unit 3 become the measurement light L1 that is interference light, and the measurement light L1 is emitted from the beam splitter unit 3 to the outside of the optical module 1 through the optical surface 33d. According to the optical module 1, it is possible to reciprocate the movable mirror 11 at a high speed along the Z-axis direction, and thus it is possible to provide a small-sized high-accuracy Fourier transformation type infrared spectral analyzer (FTIR).

The support 22 corrects an optical path difference between the optical path P1 between the beam splitter unit 3 and the movable mirror 11, and the optical path P2 between the beam splitter unit 3 and the fixed mirror 21. Specifically, the optical path P1 is an optical path ranging from the half mirror surface 31 to the mirror surface 11a of the movable mirror 11 which is located at a reference position with the total reflection mirror surface 32 and the optical surface 33b sequentially interposed therebetween, and is an optical path along which the part of the measurement light L0 proceeds. The optical path P2 is an optical path ranging from the half mirror surface 31 to the mirror surface 21a of the fixed mirror 21 with the optical surface 33c and the first optical function unit 17 sequentially interposed therebetween, and is an optical path through which the remainder of the measurement light L0 proceeds. The support 22 corrects the optical path difference between the optical path P1 and the optical path P2 so that a difference between an optical path length of the optical path P1 (an optical path length in consideration of a refractive index of each medium through which the optical path P1 passes), and an optical path length of the optical path P2 (an optical path length in consideration of a refractive index of each medium through which the optical path P2 passes) decreases (for example, disappears). For example, the support 22 can be formed by the same light-transmitting material as in the optical blocks which constitute the beam splitter unit 3. In this case, the thickness of the support 22 (a length in the Z-axis direction) can be set to be the same as a distance between the half mirror surface 31 and the total reflection mirror surface 32 in the X-axis direction.

[Configuration of Optical Device]

Figure 3:
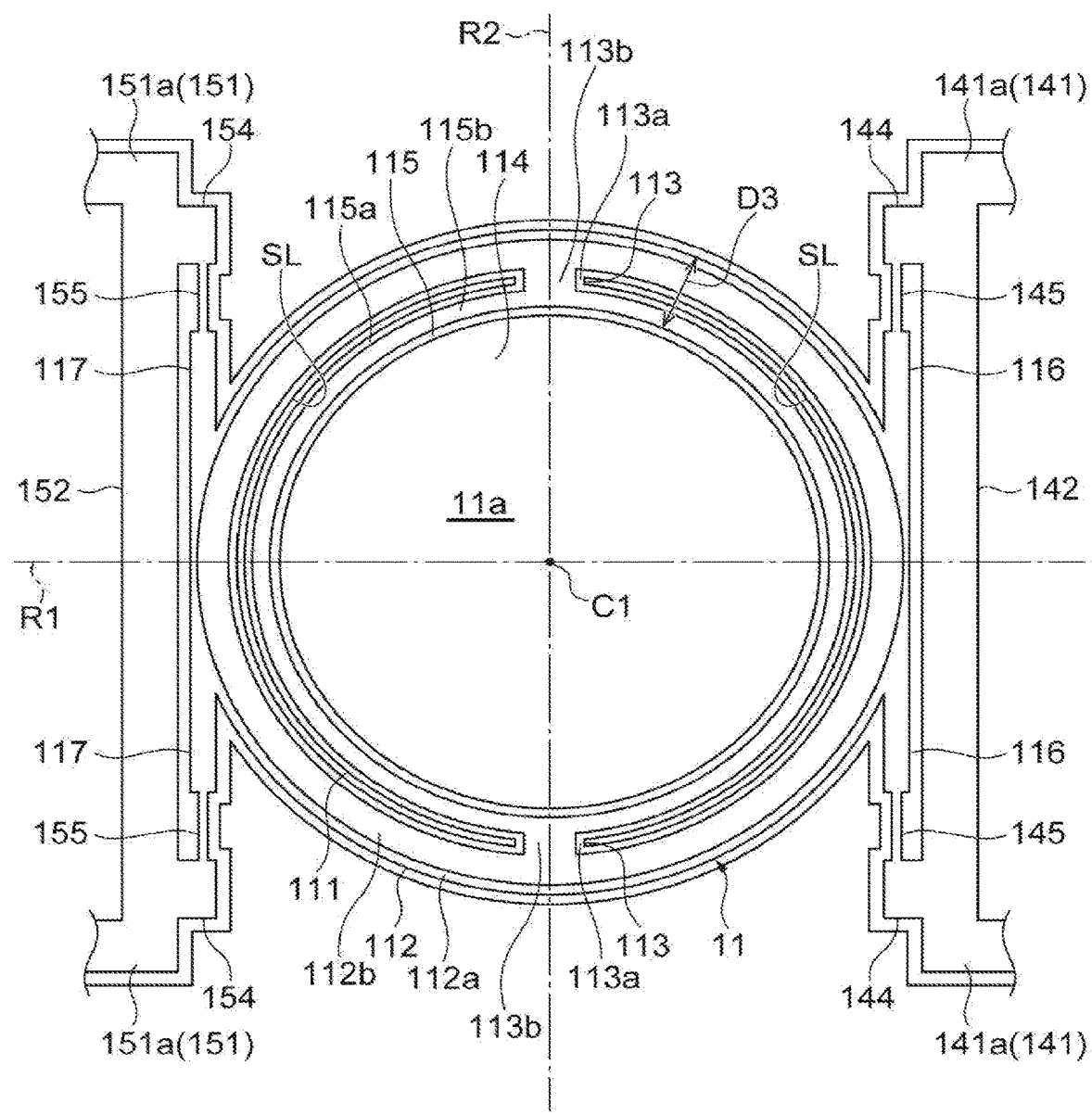
FIG. 3 is a plan view illustrating a part of FIG. 2 in an enlarged manner.
Figure 4:
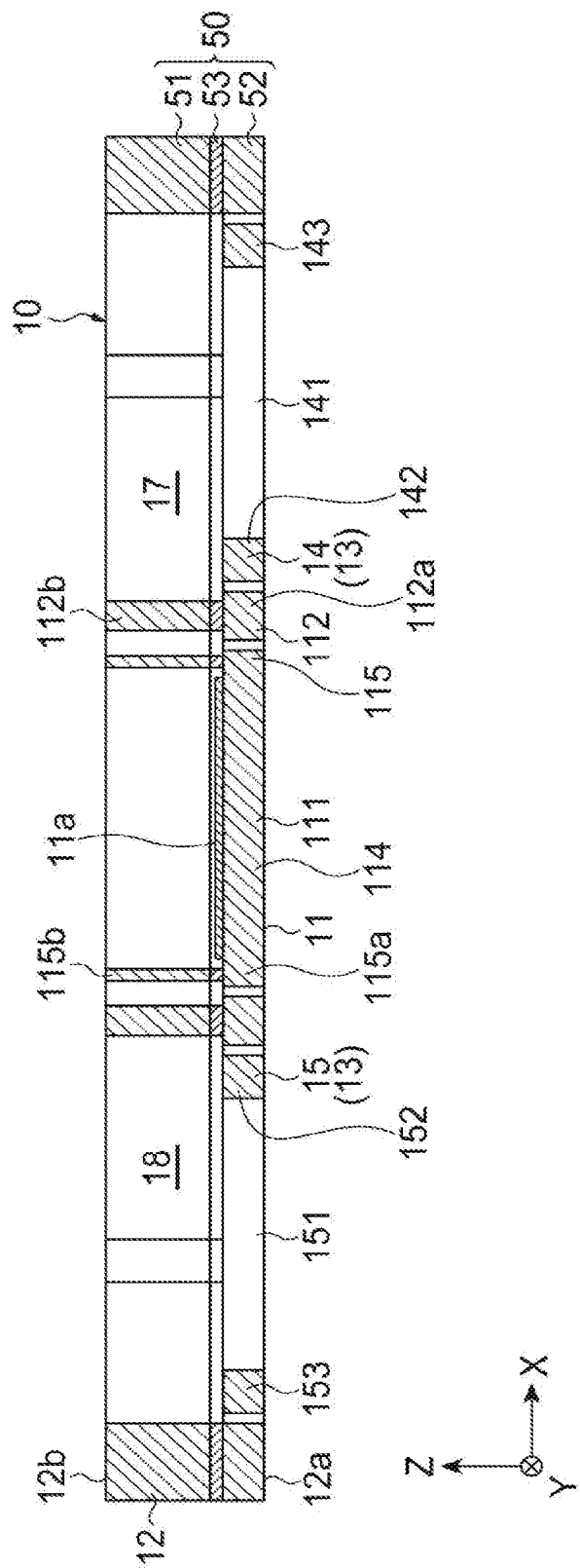
FIG. 4 is a cross-sectional view taken along line IV-IV in FIG. 2.

As illustrated in FIG. 2, FIG. 3, and FIG. 4, a portion of the movable mirror 11 excluding the mirror surface 11a, the base 12, the drive unit 13, the first optical function unit 17, and the second optical function unit 18 are constituted by a silicon on insulator (SOI) substrate 50. That is, the optical device 10 is constituted by the SOI substrate 50. For example, the optical device 10 is formed in a rectangular plate shape. For example, the optical device 10 has a size of approximately 15×10×0.3 (thickness) mm. The SOI substrate 50 includes a support layer 51, a device layer 52, and an intermediate layer 53. The support layer 51 is a first silicon layer. The device layer 52 is a second silicon layer. The intermediate layer 53 is an insulating layer that is disposed between the support layer 51 and the device layer 52.

The base 12 is formed at a part of the support layer 51, the device layer 52, and the intermediate layer 53. The main surface 12a of the base 12 is a surface of the device layer 52 on a side opposite to the intermediate layer 53. A main surface 12b of the base 12 on a side opposite to the main surface 12a is a surface of the support layer 51 on a side opposite to the intermediate layer 53. In the optical module 1, the main surface 12a of the base 12 and the surface 22a of the support 22 are joined to each other (refer to FIG. 1).

The movable mirror 11 is disposed in a state in which an intersection between an axial line R1 and an axial line R2 is set as the central position (gravity center position). An intersection of the axial line R1 and the axial line R2 matches a center C1 of the main body portion 111 to be described later. The axial line R1 is a straight line that extends in the X-axis direction. The axial line R2 is a straight line that extends in a Y-axis direction (a direction parallel to a Y-axis, a second direction) that is perpendicular to the X-axis direction and the Z-axis direction. The optical device 10 has a shape that is linearly symmetric to each of the axial line R1 and the axial line R2 when viewed from the Z-axis direction.

The movable mirror 11 includes a main body portion 111, a frame portion 112, and a pair of connection portions 113. The main body portion 111 has a circular shape when viewed from the Z-axis direction. The main body portion 111 includes a central portion 114 and an outer edge portion 115. For example, the mirror surface 11a having a circular shape is provided on a surface of the central portion 114 on the main surface 12b side by forming a metal film thereon. The central portion 114 is formed by a part of the device layer 52. The outer edge portion 115 surrounds the central portion 114 when viewed from the Z-axis direction. The outer edge portion 115 includes a first main body portion 115a and a first rib portion 115b. The first main body portion 115a is formed by a part of the device layer 52.

The first rib portion 115b is formed at a part of the support layer 51 and the intermediate layer 53. The first rib portion 115b is provided on a surface of the first main body portion 115a on the main surface 12b side. The first rib portion 115b is formed so that the thickness of the outer edge portion 115 in the Z-axis direction is larger than the thickness of the central portion 114 in the Z-axis direction. The first rib portion 115b has a circular ring shape when viewed from the Z-axis direction, and surrounds the mirror surface 11a. The first rib portion 115b extends along an outer edge of the main body portion 111 when viewed from the Z-axis direction. In this embodiment, an outer edge of the first rib portion 115b extends along the outer edge of the main body portion 111 with a predetermined interval from the outer edge of the main body portion 111 when viewed from the Z-axis direction. An inner edge of the first rib portion 115b extends along an outer edge of the mirror surface 11a with a predetermined interval from the outer edge of the mirror surface 11a when viewed from the Z-axis direction.

The frame portion 112 surrounds the main body portion 111 with a predetermined interval G (refer to FIG. 5) from the main body portion 111 when viewed from the Z-axis direction. The frame portion 112 has a circular ring shape when viewed from the Z-axis direction. A pair of slits SL having a circular arc-shaped cross-section is formed between the frame portion 112 and the main body portion 111 when viewed from the Z-axis direction. A width of the slit SL is the same as the interval G. The frame portion 112 extends in a ring shape to surround the main body portion 111 when viewed from the Z-axis direction. For example, in this embodiment, when viewed from the Z-axis direction, an inner edge of the frame portion 112 extends along an outer edge of the main body portion 111 and an outer edge of the frame portion 112 extends along the inner edge of the frame portion 112. The frame portion 112 includes a second main body portion 112a and a second rib portion 112b. The second main body portion 112a is formed by a part of the device layer 52.

The second rib portion 112b is formed by a part of the support layer 51 and the intermediate layer 53. The second rib portion 112b is provided on a surface of the second main body portion 112a on the main surface 12b side. The second rib portion 112b is formed so that the thickness of the frame portion 112 in the Z-axis direction is larger than the thickness of the central portion 114 in the Z-axis direction. The second rib portion 112b has a circular ring shape when viewed from the Z-axis direction. An outer edge of the second rib portion 112b extends along an outer edge of the frame portion 112 with a predetermined interval from the outer edge of the frame portion 112 when viewed from the Z-axis direction. An inner edge of the second rib portion 112b extends along an inner edge of the frame portion 112 with a predetermined interval from the inner edge of the frame portion 112 when viewed from the Z-axis direction.

The thickness of the second rib portion 112b in the Z-axis direction is the same as the thickness of the first rib portion 115b in the Z-axis direction. A width of the second rib portion 112b is wider than a width of the first rib portion 115b when viewed from the Z-axis direction. The width of the first rib portion 115b when viewed from the Z-axis direction is a length of the first rib portion 115b in a direction that is perpendicular to an extending direction of the first rib portion 115b, and is a length of the first rib portion 115b in a radial direction of the first rib portion 115b in this embodiment. This is also true of a width of the second rib portion 112b when viewed from the Z-axis direction.

The pair of connection portions 113 connect the main body portion 111 and the frame portion 112. The pair of connection portions 113 are disposed in a point symmetry with respect to the center C1 of the main body portion 111 when viewed from the Z-axis direction. The pair of connection portions 113 are respectively disposed on one side and on the other side in the Y-axis direction with respect to the main body portion 111. Each of the connection portions 113 includes a third main body portion 113a and a third rib portion 113b. The third main body portion 113a is formed by a part of the device layer 52. The third main body portion 113a is connected to the first main body portion 115a and the second main body portion 112a.

The third rib portion 113b is formed by a part of the support layer 51 and the intermediate layer 53. The third rib portion 113b is connected to the first rib portion 115b and the second rib portion 112b. The third rib portion 113b is provided on a surface of the third main body portion 113a on the main surface 12b side. The third rib portion 113b is formed so that the thickness of the connection portion 113 in the Z-axis direction is larger than the thickness of the central portion 114 in the Z-axis direction. The thickness of the third rib portion 113b in the Z-axis direction is the same as the thickness of each of the first rib portion 115b and the second rib portion 112b in the Z-axis direction. A width of the third rib portion 113b is larger than a width of each of the first rib portion 115b and the second rib portion 112b. The width of the third rib portion 113b is a length of the third rib portion 113b along an extending direction of the first rib portion 115b.

The movable mirror 11 further includes a pair of brackets 116 and a pair of brackets 117. The brackets 116 and the brackets 117 are formed by a part of the device layer 52. The brackets 116 extend along the Y-axis direction and have a rectangular shape when viewed from the Z-axis direction. One of the brackets 116 protrudes from a lateral surface of the frame portion 112 toward one side in the Y-axis direction, and the other bracket 116 protrudes from the lateral surface of the frame portion 112 toward the other side in the Y-axis direction. The pair of brackets 116 are disposed on the same central line parallel to the Y-axis direction. The brackets 116 extend from an end of the frame portion 112 on the first optical function unit 17 side.

The brackets 117 extend along the Y-axis direction, and have a rectangular shape when viewed from the Z-axis direction. One of the brackets 117 protrudes from the lateral surface of the frame portion 112 toward the one side in the Y-axis direction, and the other bracket 117 protrudes from the lateral surface of the frame portion 112 toward the other side in the Y-axis direction. The pair of brackets 117 are disposed on the same central line parallel to the Y-axis direction. The brackets 117 extend from an end of the frame portion 112 on the second optical function unit 18 side (a side opposite to the first optical function unit 17).

The drive unit 13 includes a first elastic support unit 14, a second elastic support unit 15, and an actuator unit 16. The first elastic support unit 14, the second elastic support unit 15, and the actuator unit 16 are formed by the device layer 52.

Each of the first elastic support unit 14 and the second elastic support unit 15 is connected between the base 12 and the movable mirror 11. The first elastic support unit 14 and the second elastic support unit 15 support the movable mirror 11 so that the movable mirror 11 is movable along the Z-axis direction.

The first elastic support unit 14 includes a pair of levers (first levers) 141, a link 142, a link 143, a pair of brackets 144, a pair of first torsion bars (first torsion support portions) 145, a pair of third torsion bars (third torsion support portions) 146, and a pair of electrode support portions 147. The pair of levers 141 are respectively disposed on both sides of the first optical function unit 17 in the Y-axis direction. The levers 141 have a plate shape that extends along a plane perpendicular to the Z-axis direction. In this embodiment, the levers 141 extend along the X-axis direction.

The link 142 bridges ends 141a of the pair of levers 141 on the movable mirror 11 side. The link 142 has a plate shape that extends along a plane perpendicular to the Z-axis direction. The link 142 extends along the Y-axis direction. The link 143 bridges ends 141b of the pair of levers 141 on a side opposite to the movable mirror 11. The link 143 has a plate shape that extends along a plane perpendicular to the Z-axis direction, and extends along the Y-axis direction. In this embodiment, the first optical function unit 17 is an opening that is defined by the pair of levers 141, the link 142, and the link 143. The first optical function unit 17 has a rectangular shape when viewed from the Z-axis direction. For example, the first optical function unit 17 is a cavity. Alternatively, a material having optical transparency with respect to the measurement light L0 may be disposed in the opening that constitutes the first optical function unit 17.

The brackets 144 have a rectangular shape when viewed from the Z-axis direction. The brackets 144 are formed on a surface of the link 142 on the movable mirror 11 side to protrude toward the movable mirror 11 side. One of the brackets 144 is disposed in the vicinity of one end of the link 142, and the other bracket 144 is disposed in the vicinity of the other end of the link 142.

The pair of first torsion bars 145 respectively bridge a tip end of one of the brackets 116 and one of the brackets 144, and a tip end of the other bracket 116 and the other bracket 144. That is, the pair of first torsion bars 145 are respectively connected between the pair of levers 141 and the movable mirror 11. The first torsion bars 145 extend along the Y-axis direction. The pair of first torsion bars 145 are disposed on the same central line parallel to the Y-axis direction.

The pair of third torsion bars 146 respectively bridge an end 141b of one of the levers 141 on a side opposite to the movable mirror 11 and the base 12, and an end 141b of the other lever 141 on a side opposite to the movable mirror 11 and the base 12. That is, the pair of third torsion bars 146 are respectively connected between the pair of levers 141 and the base 12. The third torsion bars 146 extend along the Y-axis direction. The pair of third torsion bars 146 are disposed on the same central line parallel to the Y-axis direction. The end 141b of each of the levers 141 is provided with a protrusion 141c that protrudes toward an outer side in the Y-axis direction, and each of the third torsion bars 146 is connected to the protrusion 141c.

The electrode support portions 147 extend along the Y-axis direction, and have a rectangular shape when viewed from the Z-axis direction. One of the electrode support portions 147 extends from an intermediate portion of one of the levers 141 toward a side opposite to the first optical function unit 17. The other electrode support portion 147 protrudes from an intermediate portion of the other lever 141 toward a side opposite to the first optical function unit 17. The pair of electrode support portions 147 are disposed on the same central line parallel to the Y-axis direction when viewed from the Z-axis direction.

The second elastic support unit 15 includes a pair of levers (second levers) 151, a link 152, a link 153, a pair of brackets 154, a pair of second torsion bars (second torsion support portions) 155, a pair of fourth torsion bars (fourth torsion support portions) 156, and a pair of electrode support portions 157. The pair of levers 151 are respectively disposed on both sides of the second optical function unit 18 in the Y-axis direction. The levers 151 have a plate shape that extends along a plane perpendicular to the Z-axis direction. In this embodiment, the levers 151 extend along the X-axis direction.

The link 152 bridges ends 151a of the pair of levers 151 on the movable mirror 11 side. The link 152 has a plate shape that extends along a plane perpendicular to the Z-axis direction. The link 152 extends along the Y-axis direction. The link 153 bridges ends 151b of the pair of levers 151 on a side opposite to the movable mirror 11. The link 153 has a plate shape that extends along a plane perpendicular to the Z-axis direction, and extends along the Y-axis direction. In this embodiment, the second optical function unit 18 is an opening that is defined by the pair of levers 151, the link 152, and the link 153. The second optical function unit 18 has a rectangular cross-sectional shape when viewed from the Z-axis direction. For example, the second optical function unit 18 is a cavity. Alternatively, a material having optical transparency with respect to the measurement light L0 may be disposed in the opening that constitutes the second optical function unit 18.

The brackets 154 have a rectangular shape when viewed from the Z-axis direction. The brackets 154 are formed on a surface of the link 152 on the movable mirror 11 side to protrude toward the movable mirror 11 side. One of the brackets 154 is disposed in the vicinity of one end of the link 152, and the other bracket 154 is disposed in the vicinity of the other end of the link 152.

The pair of second torsion bars 155 respectively bridge a tip end of one of the brackets 117 and one of the brackets 154, and a tip end of the other bracket 117 and the other bracket 154. That is, the pair of second torsion bars 155 are respectively connected between the pair of levers 151 and the movable mirror 11. The second torsion bars 155 extend along the Y-axis direction. The pair of second torsion bars 155 are disposed on the same central line parallel to the Y-axis direction.

The pair of fourth torsion bars 156 respectively bridge an end 151b of one of the levers 151 on a side opposite to the movable mirror 11 and the base 12, and an end 151b of the other lever 151 on a side opposite to the movable mirror 11 and the base 12. That is, the pair of fourth torsion bars 156 are respectively connected between the pair of levers 151 and the base 12. The fourth torsion bars 156 extend along the Y-axis direction. The pair of fourth torsion bars 156 are disposed on the same central line parallel to the Y-axis direction. The end 151b of each of the levers 151 is provided with a protrusion 151c that protrudes toward an outer side in the Y-axis direction, and each of the fourth torsion bars 156 is connected to the protrusion 151c.

The electrode support portions 157 extend along the Y-axis direction, and have a rectangular shape when viewed from the Z-axis direction. One of the electrode support portions 157 extends from an intermediate portion of one of the levers 151 toward a side opposite to the second optical function unit 18. The other electrode support portion 157 protrudes from an intermediate portion of the other lever 151 toward a side opposite to the second optical function unit 18. The pair of electrode support portions 157 are disposed on the same central line parallel to the Y-axis direction when viewed from the Z-axis direction.

The actuator unit 16 moves the movable mirror 11 along the Z-axis direction. The actuator unit 16 includes a pair of fixed comb electrodes 161, a pair of movable comb electrodes 162, a pair of fixed comb electrodes 163, and a pair of movable comb electrodes 164. Positions of the fixed comb electrodes 161 and 163 are fixed. The movable comb electrodes 162 and 164 move in accordance with movement of the movable mirror 11.

One of the fixed comb electrodes 161 is provided on a surface the device layer 52 of the base 12 which faces one of the electrode support portions 147. The other fixed comb electrode 161 is provided on a surface of the device layer 52 which faces the other electrode support portion 147. Each of the fixed comb electrodes 161 includes a plurality of fixed comb fingers 161a which extend along a plane perpendicular to the Y-axis direction. The fixed comb fingers 161a are disposed to be aligned with a predetermined interval in the Y-axis direction.

One of the movable comb electrodes 162 is provided on both surfaces of one of the electrode support portions 147 in the X-axis direction. The other movable comb electrode 162 is provided on both surfaces of the other electrode support portion 147 in the X-axis direction. Each of the movable comb electrodes 162 includes a plurality of movable comb fingers 162a which extend along a plane perpendicular to the Y-axis direction. The movable comb fingers 162a are disposed to be aligned with a predetermined interval in the Y-axis direction.

In one of the fixed comb electrodes 161 and one of the movable comb electrodes 162, the plurality of fixed comb fingers 161a and the plurality of movable comb fingers 162a are alternately disposed. That is, each of the fixed comb fingers 161a of one of the fixed comb electrodes 161 is located between the movable comb fingers 162a of one of the movable comb electrodes 162. In the other fixed comb electrode 161 and the other movable comb electrode 162, the plurality of fixed comb fingers 161a and the plurality of movable comb fingers 162a are alternately disposed. That is, each of the fixed comb fingers 161a of the other fixed comb electrode 161 is located between the movable comb fingers 162a of the other movable comb electrode 162. In the pair of fixed comb electrodes 161 and the pair of movable comb electrodes 162, the fixed comb fingers 161a and the movable comb fingers 162a which are adjacent to each other face each other in the Y-axis direction. For example, a distance between the fixed comb fingers 161a and the movable comb fingers 162a which are adjacent to each other is approximately several μm.

One of the fixed comb electrodes 163 is provided on a surface of the device layer 52 of the base 12 which faces one of the electrode support portions 157. The other fixed comb electrode 163 is provided on a surface of the device layer 52 which faces the other electrode support portion 157. Each of the fixed comb electrodes 163 includes a plurality of fixed comb fingers 163a which extend along a plane perpendicular to the Y-axis direction. The fixed comb fingers 163a are disposed to be aligned with a predetermined interval in the Y-axis direction.

One of the movable comb electrodes 164 is provided on both surfaces of one of the electrode support portions 157 in the X-axis direction. The other movable comb electrode 164 is provided on both surfaces of the other electrode support portion 157 in the X-axis direction. Each of the movable comb electrodes 164 includes a plurality of movable comb fingers 164a which extend along a plane perpendicular to the Y-axis direction. The movable comb fingers 164a are disposed to be aligned with a predetermined interval in the Y-axis direction.

In one of the fixed comb electrodes 163 and one of the movable comb electrodes 164, the plurality of fixed comb fingers 163a and the plurality of movable comb fingers 164a are alternately disposed. That is, each of the fixed comb fingers 163a of one of the fixed comb electrodes 163 is located between the movable comb fingers 164a of one of the movable comb electrodes 164. In the other fixed comb electrode 163 and the other movable comb electrode 164, the plurality of fixed comb fingers 163a and the plurality of movable comb fingers 164a are alternately disposed. That is, each of the fixed comb fingers 163a of the other fixed comb electrode 163 is located between the movable comb fingers 164a of the other movable comb electrode 164. In the pair of fixed comb electrodes 163 and the pair of movable comb electrodes 164, the fixed comb fingers 163a and the movable comb fingers 164a which are adjacent to each other face each other in the Y-axis direction. For example, a distance between the fixed comb fingers 163a and the movable comb fingers 164a which are adjacent to each other is approximately several μm.

A plurality of electrode pads 121 and 122 are provided in the base 12. The electrode pads 121 and 122 are formed on a surface of the device layer 52 in openings 12c formed in the main surface 12b of the base 12 to reach the device layer 52. The electrode pads 121 are electrically connected to the fixed comb electrodes 161 or the fixed comb electrodes 163 through the device layer 52. The electrode pads 122 are electrically connected to the movable comb electrodes 162 or the movable comb electrodes 164 through the first elastic support unit 14 or the second elastic support unit 15. Each of the wires 26 bridges each of the electrode pads 121 and 122 and each of the lead pins 25.

In the optical device 10 constituted as described above, when a voltage is applied to between the plurality of electrode pads 121 and the plurality of electrode pads 122 through the plurality of lead pins 25 and the plurality of wires 26, an electrostatic force occurs between the fixed comb electrodes 161 and the movable comb electrodes 162 which face each other, and between the fixed comb electrodes 163 and the movable comb electrodes 164 which face each other to move the movable mirror 11, for example, toward one side in the Z-axis direction. At this time, the first torsion bar 145, the third torsion bar 146, the second torsion bar 155, and the fourth torsion bar 156 in the first elastic support unit 14 and the second elastic support unit 15 are twisted, and an elastic force occurs in the first elastic support unit 14 and the second elastic support unit 15. In the optical device 10, when a periodic electric signal is applied to the drive unit 13 through the plurality of lead pins 25 and the plurality of wires 26, it is possible to reciprocate the movable mirror 11 along the Z-axis direction at a resonance frequency level. In this manner, the drive unit 13 functions as an electrostatic actuator.

[Detailed Configuration of Movable Mirror]

Figure 5:
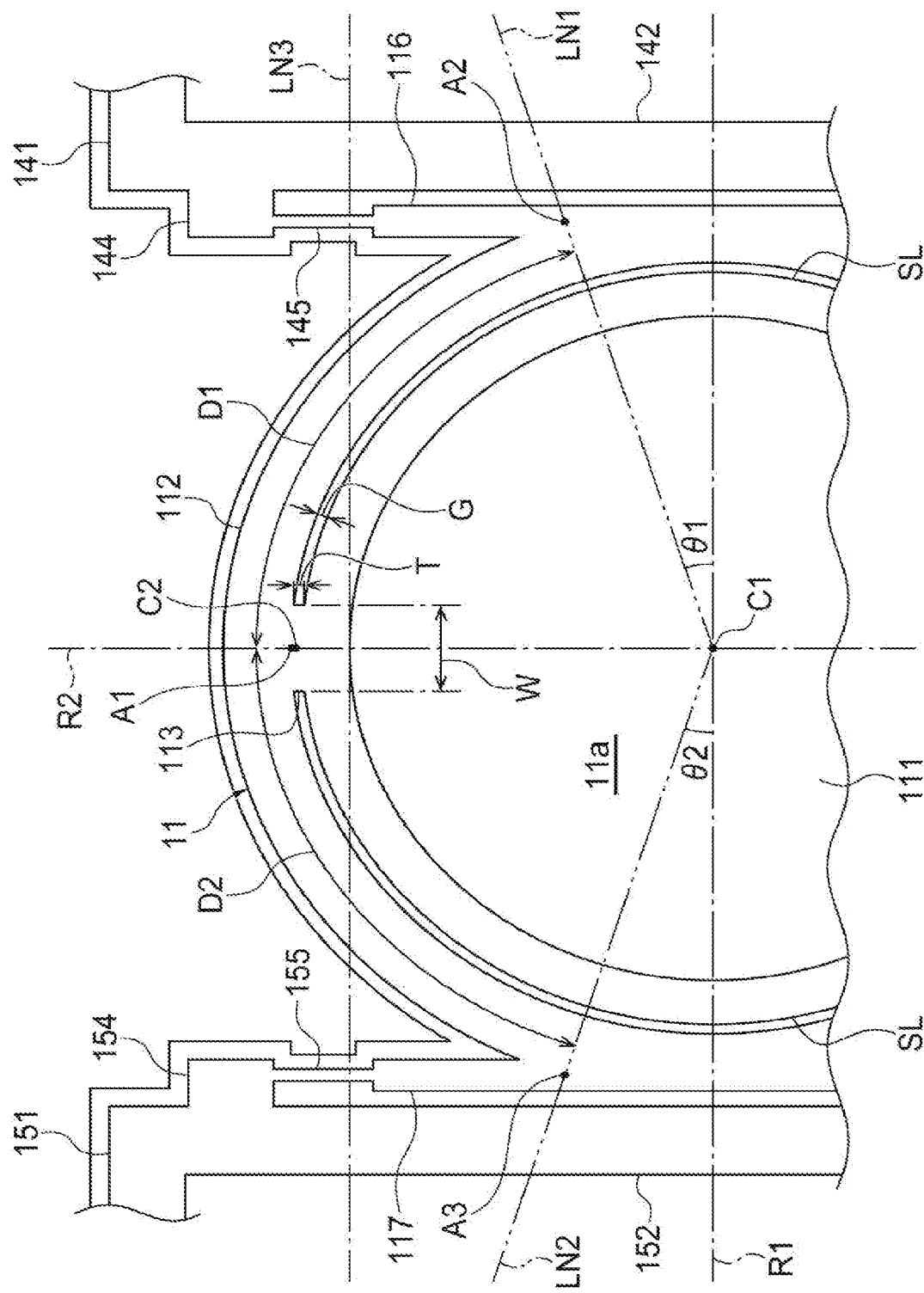
FIG. 5 is a plan view illustrating a part of FIG. 2 in an enlarged manner.

The configuration of the movable mirror 11 will be described in more detail with reference to FIG. 5. In FIG. 5, the first rib portion 115b, the second rib portion 112b, and the third rib portion 113b are omitted. In the following description, a position at which the frame portion 112 and the connection portions 113 are connected to each other is set as a connection position A1, a position at which the frame portion 112 and the first torsion bars 145 are connected to each other is set as a connection position A2, and a position at which the frame portion 112 and the second torsion bars 155 are connected to each other is set as a connection position A3.

In a case where the frame portion 112 and the first torsion bar 145 are connected to each other through another element (in this embodiment, the bracket 116) as in this embodiment, the connection position A2 is a position at which the frame portion 112 and the other element are connected to each other. In other words, the connection position A2 is a connection position between the first torsion support portion and the frame portion 112. For example, in a case where the first torsion support portion includes an element other than the first torsion bar 145, the connection position A2 may be a position at which the element other than the first torsion bar 145 and the frame portion 112 are connected to each other. For example, in a case where the first torsion support portion includes a meandering portion that extends in a meandering manner and is connected to the first torsion bar 145 and the frame portion 112 when viewed from the Z-axis direction, the connection position A2 is a position at which the meandering portion and the frame portion 112 are connected to each other. Similarly, in a case where the frame portion 112 and the first torsion bar 145 are connected to each other through another element (in this embodiment, the bracket 117) as in this embodiment, the connection position A3 is a position at which the frame portion 112 and the other element are connected to each other. In other words, in a case where the connection position A3 is a connection position between the second torsion support portion and the frame portion 112, and for example, the second torsion support portion includes an element other than the second torsion bar 155, the connection position A3 may be a position at which the element other than the second torsion bar 155 and the frame portion 112 are connected to each other.

For example, the connection position A1 is a central portion of a connection portion between the frame portion 112 and the connection portion 113. In this embodiment, the connection position A1 is a position of an intersection between an inner edge of the frame portion 112, and a straight line (the axial line R2 in an example in FIG. 5) that passes through the center C2 of the connection portion 113 and the center C1 of the main body portion 111. For example, the connection position A2 is a central portion of a connection portion between the frame portion 112 and the first torsion bar 145 (first torsion support portion). In this embodiment, the connection position A2 is a position of an intersection between an outer edge of the frame portion 112 (a line segment that virtually extends from the outer edge) and a central line of the first torsion bar 145 and the bracket 116. In a case where the frame portion 112 and the first torsion bar 145 are connected to each other through another element, for example, the connection position A2 is a central portion of a connection portion between the frame portion 112 and the other element. For example, the connection position A3 is a central portion of a connection portion between the frame portion 112 and the second torsion bar 155 (second torsion support portion). In this embodiment, the connection position A3 is a position of an intersection between an outer edge of the frame portion 112 (a line segment that virtually extends from the outer edge) and a central line of the second torsion bar 155 and the bracket 117. In a case where the frame portion 112 and the second torsion bar 155 are connected to each other through another element, for example, the connection position A3 is a central portion of a connection portion between the frame portion 112 and the other element.

In the frame portion 112, the connection position A1 with each of the connection portions 113 is located between the connection position A2 with each of the first torsion bars 145 and the connection position A3 with each of the second torsion bars 155. That is, as illustrated in FIG. 5, in the frame portion 112, the connection position A1 with one of the connection portions 113 is located between the connection position A2 with one of the first torsion bars 145 and the connection position A3 with one of the second torsion bars 155. Similarly, in the frame portion 112, the connection position A1 with the other connection portion 113 is located between the connection position A2 with the other first torsion bar 145 and the connection position A3 with the other second torsion bar 155.

When viewed from the Z-axis direction, an angle θ1 made by a straight line LN1 that passes through the connection position A2 between the frame portion 112 and one of the first torsion bars 145 and the center C1 of the main body portion 111, and the axial line R1 (a straight line that is perpendicular to the Y-axis direction and passes through the center C1 of the main body portion 111) is 45° or less. For example, the angle θ1 is approximately 17°. Similarly, when viewed from the Z-axis direction, an angle made by a straight line that passes through the connection position A2 between the frame portion 112 and the other first torsion bar 145 and the center C1 of the main body portion 111, and the axial line R1 is 45° or less.

When viewed from the Z-axis direction, an angle θ2 made by a straight line LN2 that passes through the connection position A3 between the frame portion 112 and one of the second torsion bars 155 and the center C1 of the main body portion 111, and the axial line R1 is 45° or less. For example, the angle θ2 is the same as the angle θ1. Similarly, when viewed from the Z-axis direction, an angle made by a straight line that passes through the connection position A3 between the frame portion 112 and the other second torsion bar 155 and the center C1 of the main body portion 111, and the axial line R1 is 45° or less.

A width W of the connection portions 113 is larger than the interval G between the main body portion 111 and the frame portion 112. In other words, the width W of the connection portions 113 is larger than a length T of the connection portions 113. The width W of the connection portions 113 is a length of the connection portions 113 along an extending direction of the frame portion 112, and is a length of the connection portions 113 along a peripheral direction of the frame portion 112 in this embodiment. The length T of the connection portions 113 is a length of the connection portions 113 in a direction perpendicular to the extending direction of the frame portion 112, and is a length of the connection portions 113 in a radial direction of the frame portion 112 in this embodiment. In this embodiment, the interval G is constant at all positions in the peripheral direction, but the interval G may not constant at all positions in the peripheral direction. For example, a plurality of regions in which the interval G is different in each case may exist. In this case, the width W of the connection portions 113 may be larger than a minimum value of the interval G.

The width W of each of the connection portions 113 is smaller than any of distances from the connection position A1 with each of the connection portions 113 in the frame portion 112 to the connection positions A2 and A3 with each of the first torsion bars 145 and each of the second torsion bars 155. That is, as illustrated in FIG. 5, the width W of one of the connection portions 113 is smaller than a distance D1 from the connection position A1 with the one connection portion 113 in the frame portion 112 to the connection position A2 with one of the first torsion bars 145, and is smaller than a distance D2 from the connection position A1 with the one connection portion 113 in the frame portion 112 to the connection position A3 with one of the second torsion bars 155. The distance D1 is smaller than a distance from the connection position A1 with the one connection portion 113 in the frame portion 112 to a connection position with the other first torsion bar 145. The distance D2 is smaller than a distance from the connection position A1 with the one connection portion 113 in the frame portion 112 to a connection position with the other second torsion bar 155. Accordingly, the width W of one of the connection portions 113 is smaller than any of distances from the connection position A1 with the one connection portion 113 in the frame portion 112 to the connection positions A2 and A3 with each of the first torsion bars 145 and each of the second torsion bars 155. Similarly, the width W of the other connection portion 113 is smaller than any of distances from the connection position A1 with the other connection portion 113 in the frame portion 112 to the connection positions A2 and A3 with each of the first torsion bars 145 and each of the second torsion bars 155. The distance D1 and D2 are distances along the extending direction of the frame portion 112, and a distance along the peripheral direction of the frame portion 112 in this embodiment.

In this embodiment, the width W of each of the connection portions 113 is less than ⅓ times any of the distances from the connection position A1 with each of the connection portions 113 in the frame portion 112 to the connection positions A2 and A3 with each of the first torsion bars 145 and each of the second torsion bars 155. The width W of the connection portion 113 is smaller than a distance D3 (refer to FIG. 3) from the inner edge of the first rib portion 115b to the outer edge of the frame portion 112 when viewed from the Z-axis direction. For example, the distance D3 is a distance from the inner edge of the first rib portion 115b to the outer edge of the frame portion 112 in a direction perpendicular to the extending direction of the frame portion 112.

Each of the connection portions 113 is provided not to intersect a straight line LN3 that is perpendicular to a straight line (axial line R2 in FIG. 5) that passes through the center C2 of the connection portion 113 and the center C1 of the main body portion 111 and is in contact with an outer edge of the mirror surface 11a when viewed from the Z-axis direction. That is, in a case where the width W of the connection portion 113 is set to be wider than a predetermined width, the connection portion 113 intersects the straight line LN3, but in this embodiment, the width of the connection portion 113 is set so that the connection portion 113 does not intersect the straight line LN3. In other words, the connection portion 113 is disposed on an outer side in the Y-axis direction in comparison to the straight line LN3.

[Function and Effect]

In the above-described optical device 10, the movable mirror 11 includes the main body portion 111, the frame portion 112 that surrounds the main body portion 111 with the predetermined interval G from the main body portion 111 when viewed from the Z-axis direction, and the pair of connection portions 113 which connect the main body portion 111 and the frame portion 112. Accordingly, a sectional force from the first torsion bar 145 and the second torsion bar 155 is less likely to be transmitted to the main body portion 111, and thus it is possible to suppress distortion of the main body portion 111. In addition, because the first rib portion 115b is formed, the thickness of the outer edge portion 115 in the Z-axis direction is larger than the thickness of the central portion 114 in the Z-axis direction. Accordingly, it is possible to more reliably suppress distortion of the main body portion 111. In addition, because the second rib portion 112b is formed, the thickness of the frame portion 112 in the Z-axis direction is larger than the thickness of the central portion 114 in the Z-axis direction. Accordingly, it is possible to suppress distortion of the frame portion 112, and it is possible to suppress distortion of the main body portion 111 which is caused by the distortion of the frame portion 112.

In addition, in the optical device 10, the width W of each of the connection portions 113 is smaller than the distance from the connection position A1 with each of the connection portions 113 in the frame portion 112 to any of the connection positions A2 and A3 with each of the first torsion bars 145 and each of the second torsion bars 155. Accordingly, it is possible to secure a distance from the connection position A1 with each of the connection portions 113 in the frame portion 112 to the connection position with each of the first torsion bars 145 and the connection position with each of the second torsion bars 155. As a result, the sectional force from the first torsion bar 145 and the second torsion bar 155 is further less likely to be transmitted to the main body portion 111, and thus it is possible to more reliably suppress distortion of the main body portion 111. In addition, in the optical device 10, the width W of each of the connection portions 113 is larger than the interval G between the main body portion 111 and the frame portion 112. Accordingly, it is possible to secure the strength of the connection portions 113, and thus even in a case where distortion of the main body portion 111 is suppressed by connecting the main body portion 111 and the frame portion 112 with the connection portions 113, it is possible to secure the reliability. As described above, according to the optical device 10, it is possible to secure the reliability while suppressing distortion of the movable mirror 11.

In addition, in the optical device 10, in the frame portion 112, the connection position A1 with each of the connection portions 113 is located between the connection position A2 with each of the first torsion bars 145 and the connection position A3 with each of the second torsion bars 155. According to this configuration, it is also possible to secure the reliability with suppressing distortion of the movable mirror 11.

In addition, in the optical device 10, the pair of connection portions 113 are disposed in a point symmetry with respect to the center C1 of the main body portion 111 when viewed from the Z-axis direction. Accordingly, it is possible to improve balance of the movable mirror 11, and it is possible to more reliably suppress distortion of the main body portion 111.

In addition, in the optical device 10, the width W of each of the connection portions 113 is less than ⅓ times the distance from the connection position with each of the connection portions 113 in the frame portion 112 to any of the connection position with each of the first torsion bars 145 and the connection position with each of the second torsion bars 155. Accordingly, the sectional force from the first torsion bar 145 and the second torsion bar 155 is further less likely to be transmitted to the main body portion 111, and thus it is possible to more reliably suppress distortion of the main body portion 111.

In addition, in the optical device 10, the width W of each of the connection portions 113 is smaller than the distance D3 from the inner edge of the first rib portion 115b to the outer edge of the frame portion 112 when viewed from the Z-axis direction. Accordingly, the sectional force from the first torsion bar 145 and the second torsion bar 155 is further less likely to be transmitted to the main body portion 111, and thus it is possible to more reliably suppress distortion of the main body portion 111.

In addition, in the optical device 10, each of the connection portions 113 is provided not to intersect the straight line LN3 that is perpendicular to the axial line R1 that passes through the center C2 of the connection portion 113 and the center C1 of the main body portion 111, and is in contact with the outer edge of the mirror surface 11a when viewed from the Z-axis direction. Accordingly, the sectional force from the first torsion bar 145 and the second torsion bar 155 is further less likely to be transmitted to the main body portion 111, and thus it is possible to more reliably suppress distortion of the main body portion 111.

In addition, in the optical device 10, each of the connection portions 113 includes the third rib portion 113b that is formed so that the thickness of each of the connection portions 113 in the Z-axis direction is larger than the thickness of the central portion 114 in the Z-axis direction. The third rib portion 113b is connected to the first rib portion 115b and the second rib portion 112b. Accordingly, it is possible to suppress distortion of the connection portion 113, and it is possible to suppress distortion of the main body portion 111 which is caused by the distortion of the connection portion 113.

In addition, in the optical device 10, when viewed from the Z-axis direction, any of the angle θ1 made by the straight line LN1 that passes through the connection position A2 between the frame portion 112 and one of the first torsion bars 145 and the center C1 of the main body portion 111, and the axial line R1, the angle made by the straight line that passes through the connection position A2 between the frame portion 112 and the other first torsion bar 145 and the center C1 of the main body portion 111, and the axial line R1, the angle θ2 made by the straight line LN2 that passes through the connection position A3 between the frame portion 112 and one of the second torsion bars 155 and the center C1 of the main body portion 111, and the axial line R1, and the angle made by the straight line that passes through the connection position A3 between the frame portion 112 and the other second torsion bar 155 and the center C1 of the main body portion 111, and the axial line R1 is 45° or less. According to this, it is possible to secure the distance from the connection position A1 with each of the connection portions 113 in the frame portion 112 to the connection positions A2 and A3 with each of the first torsion bars 145 and each of the second torsion bars 155 to be large. As a result, the load (sectional force) from the first torsion bar 145 and the second torsion bar 155 is further less likely to be transmitted to the main body portion 111, and thus it is possible to more reliably suppress distortion of the main body portion 111. In addition, because it is possible to secure the distance from the axial line R2 to each of the first torsion bars 145 and each of the second torsion bars 155, it is possible to suppress rotation of the movable mirror 11 around the axial line R2 during movement of the movable mirror 11 along the Z-axis direction. In addition, because it is possible to secure the distance between the first torsion bar 145 and the second torsion bar 155 which are adjacent to each other, it is possible to improve the degree of freedom of design of the movable mirror 11. For example, in a case where the movable comb electrodes 162 and 164 are disposed along the outer edge of the frame portion 112, it is possible to secure an arrangement space of the movable comb electrodes 162 and 164.

In addition, in the optical device 10, the first elastic support unit 14 includes the pair of levers 141 which are respectively connected to the first torsion bars 145, and the pair of third torsion bars 146 which are respectively connected between the pair of levers 141 and the base 12. The second elastic support unit 15 includes the pair of levers 151 which are respectively connected to the pair of second torsion bars 155, and the pair of fourth torsion bars 156 which are respectively connected between the pair of levers 151 and the base 12. According to this configuration, it is also possible to secure the reliability while suppressing distortion of the movable mirror 11.

Figure 6:
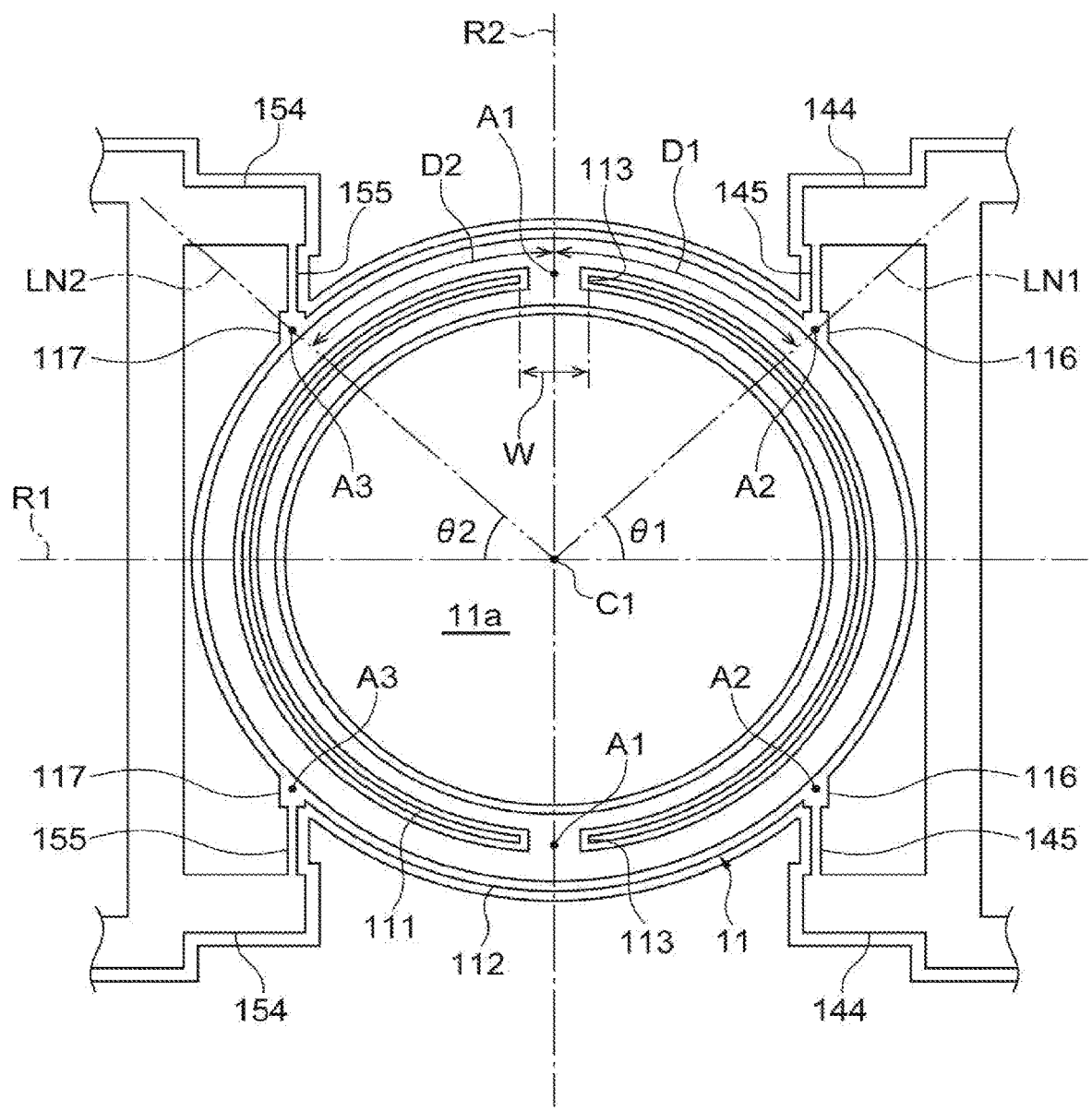
FIG. 6 is a plan view illustrating an optical device according to a first modification example.

Hereinbefore, one embodiment of the present disclosure has been described, but the present disclosure is not limited to the embodiment. The optical device 10 may be constituted as in a first modification example illustrated in FIG. 6. In the first modification example, the connection positions A2 and A3 between the frame portion 112 and each of the first torsion bars 145 and each of the second torsion bars 155 are located on a side closer to the connection position A1 between the frame portion 112 and each of the connection portions 113 in comparison to the embodiment. In the first modification example, when viewed from the Z-axis direction, the angle θ1 made by the straight line LN1 that passes through the connection position A2 between the frame portion 112 and one of the first torsion bars 145 and the center C1 of the main body portion 111, and the axial line R1 is 60° or less. For example, the angle θ1 is approximately 45°. Similarly, when viewed from the Z-axis direction, the angle made by the straight line that passes through the connection position A2 between the frame portion 112 and the other first torsion bar 145 and the center C1 of the main body portion 111, and the axial line R1 is 60° or less.

When viewed from the Z-axis direction, the angle θ2 made by the straight line LN2 that passes through the connection position A3 between the frame portion 112 and one of the second torsion bars 155 and the center C1 of the main body portion 111, and the axial line R1 is 60° or less. For example, the angle θ2 is the same as the angle θ1. Similarly, when viewed from the Z-axis direction, the angle made by the straight line that passes through the connection position A3 between the frame portion 112 and the other second torsion bar 155 and the center C1 of the main body portion 111, and the axial line R1 is 60° or less. In the first modification example, the width W of each of the connection portions 113 is also smaller than any of distances from the connection position A1 with each of the connection portions 113 in the frame portion 112 to the connection positions A2 and A3 with each of the first torsion bars 145 and each of the second torsion bars 155.

According to the first modification example, as in the embodiment, it is possible to secure the reliability while suppressing distortion of the movable mirror 11. In addition, in the first modification example, when viewed from the Z-axis direction, any of the angle θ1 made by the straight line LN1 that passes through the connection position A2 between the frame portion 112 and one of the first torsion bars 145 and the center C1 of the main body portion 111, and the axial line R1, the angle made by the straight line that passes through the connection position A2 between the frame portion 112 and the other first torsion bar 145 and the center C1 of the main body portion 111, and the axial line R1, the angle θ2 made by the straight line LN2 that passes through the connection position A3 between the frame portion 112 and one of the second torsion bars 155 and the center C1 of the main body portion 111, and the axial line R1, and the angle made by the straight line that passes through the connection position A3 between the frame portion 112 and the other second torsion bar 155 and the center C1 of the main body portion 111, and the axial line R1 is 60° or less. According to this, it is possible to secure the distance from the connection position A1 with each of the connection portions 113 in the frame portion 112 to the connection positions A2 and A3 with each of the first torsion bars 145 and each of the second torsion bars 155 to be large.

As a result, the sectional force from the first torsion bar 145 and the second torsion bar 155 is further less likely to be transmitted to the main body portion 111, and thus it is possible to more reliably suppress distortion of the main body portion 111. In addition, because it is possible to secure the distance from the axial line R2 to each of the first torsion bars 145 and each of the second torsion bars 155, it is possible to suppress rotation of the movable mirror 11 around the axial line R2 during movement of the movable mirror 11 along the Z-axis direction. In addition, because it is possible to secure the distance between the first torsion bar 145 and the second torsion bar 155 which are adjacent to each other, it is possible to improve the degree of freedom of design of the movable mirror 11. For example, in a case where the movable comb electrodes 162 and 164 are disposed along the outer edge of the frame portion 112, it is possible to secure an arrangement space of the movable comb electrodes 162 and 164.

Figure 7:
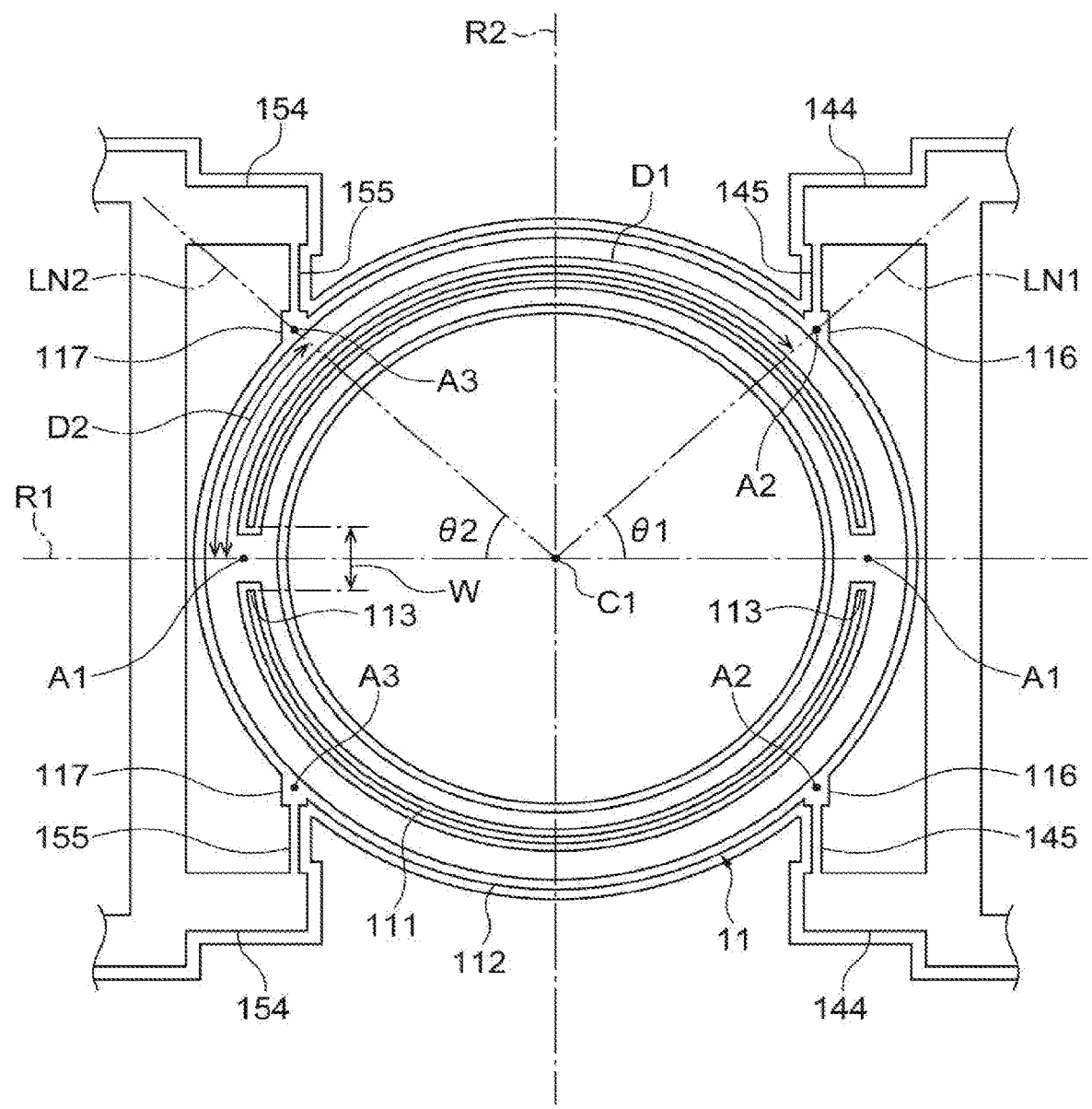
FIG. 7 is a plan view illustrating an optical device according to a second modification example.

The optical device 10 may be constituted as in a second modification example illustrated in FIG. 7. In the second modification example, the pair of connection portions 113 are respectively disposed on one side and on the other side in the X-axis direction with respect to the main body portion 111. The second modification example is constituted in a similar manner as in the first modification example with regard to the other configurations. In the second modification example, the connection position A1 with each of the connection portions 113 in the frame portion 112 is located between connection positions A2 with the first torsion bars 145, or between connection positions A3 with the second torsion bars 155. That is, the connection position A1 with one of the connection portions 113 in the frame portion 112 is located between the connection positions A2 with the first torsion bars 145. The connection position A1 with the other connection portion 113 in the frame portion 112 is located between the connection positions A3 with the second torsion bars 155.

In the second modification example, when viewed from the Z-axis direction, the angle θ1 made by the straight line LN1 that passes through the connection position A2 between the frame portion 112 and one of the first torsion bars 145 and the center C1 of the main body portion 111, and the axial line R1 is 30° to 70°. For example, the angle θ1 is approximately 45°. Similarly, when viewed from the Z-axis direction, the angle made by the straight line that passes through the connection position A2 between the frame portion 112 and the other first torsion bar 145 and the center C1 of the main body portion 111, and the axial line R1 is 30° to 70°. When viewed from the Z-axis direction, the angle θ2 made by the straight line LN2 that passes through the connection position A3 between the frame portion 112 and one of the second torsion bars 155 and the center C1 of the main body portion 111, and the axial line R1 is 30° to 70°. For example, the angle θ2 is the same as the angle θ1. Similarly, when viewed from the Z-axis direction, the angle made by the straight line that passes through the connection position A3 between the frame portion 112 and the other second torsion bar 155 and the center C1 of the main body portion 111, and the axial line R1 is 30° to 70°.

In the second modification example, the width W of each of the connection portions 113 is also smaller than any of distances from the connection position A1 with each of the connection portions 113 in the frame portion 112 to the connection positions A2 and A3 with each of the first torsion bars 145 and each of the second torsion bars 155. That is, as illustrated in FIG. 7, the width W of one of the connection portions 113 is smaller than a distance D1 from the connection position A1 with the one connection portion 113 in the frame portion 112 to the connection position A2 with one of the first torsion bars 145, and is smaller than a distance D2 from the connection position A1 with the one connection portion 113 in the frame portion 112 to the connection position A3 with one of the second torsion bars 155. The distance D1 is the same as a distance from the connection position A1 with the one connection portion 113 in the frame portion 112 to a connection position with the other first torsion bar 145. The distance D2 is the same as a distance from the connection position A1 with the one connection portion 113 in the frame portion 112 to a connection position with the other second torsion bar 155. Accordingly, the width W of one of the connection portions 113 is smaller than any of distances from the connection position A1 with the one connection portion 113 in the frame portion 112 to the connection positions A2 and A3 with each of the first torsion bars 145 and each of the second torsion bars 155. Similarly, the width W of the other connection portion 113 is smaller than any of distances from the connection position A1 with the other connection portion 113 in the frame portion 112 to the connection positions A2 and A3 with each of the first torsion bars 145 and each of the second torsion bars 155.

According to the second modification example, as in the embodiment, it is possible to secure the reliability while suppressing distortion of the movable mirror 11. In addition, in the second modification example, when viewed from the Z-axis direction, any of the angle θ1 made by the straight line LN1 that passes through the connection position A2 between the frame portion 112 and one of the first torsion bars 145 and the center C1 of the main body portion 111, and the axial line R1, the angle made by the straight line that passes through the connection position A2 between the frame portion 112 and the other first torsion bar 145 and the center C1 of the main body portion 111, and the axial line R1, the angle θ2 made by the straight line LN2 that passes through the connection position A3 between the frame portion 112 and one of the second torsion bars 155 and the center C1 of the main body portion 111, and the axial line R1, and the angle made by the straight line that passes through the connection position A3 between the frame portion 112 and the other second torsion bar 155 and the center C1 of the main body portion 111, and the axial line R1 is 30° to 70°. According to this, it is possible to secure a distance from a connection position with the base 12 in the first elastic support unit 14 and the second elastic support unit 15 to a connection position with the movable mirror 11 while securing a distance from the connection position A1 with each of the connection portions 113 in the frame portion 112 to the connection positions A2 and A3 with each of the first torsion bars 145 and each of the second torsion bars 155. As a result, it is possible to realize an increase of a movement amount of the movable mirror 11 in the Z-axis direction while suppressing distortion of the main body portion 111. In addition, because it is possible to secure distances from the axial line R2 to each of the first torsion bars 145 and each of the second torsion bars 155, it is possible to suppress rotation of the movable mirror 11 around the axial line R2 during movement of the movable mirror 11 along the Z-axis direction.

In the embodiment and the modification examples, the movable mirror 11 may include three or more connection portions 113. For example, the three connection portions 113 may be disposed in a point symmetry with respect to the center C1 of the main body portion 111 when viewed from the Z-axis direction. The first elastic support unit 14 may further include a pair of third levers which extend along the X-axis direction and are disposed on both sides of the pair of levers 141 in the Y-axis direction, and a pair of fifth torsion support portions which are respectively connected between the pair of third levers and the base 12. In this case, the pair of third torsion bars 146 are respectively connected between the pair of levers 141 and the pair of the third levers. Similarly, the second elastic support unit 15 may further include a pair of fourth levers which extend along the X-axis direction and are disposed on both sides of the pair of levers 151 in the Y-axis direction, and a pair of sixth torsion support portions which are respectively connected between the pair of fourth levers and the base 12. In this case, the pair of fourth torsion bars 156 are respectively connected between the pair of levers 151 and the pair of third levers.

In the embodiment and the first modification example, when viewed from the Z-axis direction, any of the angle θ1 made by the straight line LN1 that passes through the connection position A2 between the frame portion 112 and one of the first torsion bars 145 and the center C1 of the main body portion 111, and the axial line R1, the angle made by the straight line that passes through the connection position A2 between the frame portion 112 and the other first torsion bar 145 and the center C1 of the main body portion 111, and the axial line R1, the angle θ2 made by the straight line LN2 that passes through the connection position A3 between the frame portion 112 and one of the second torsion bars 155 and the center C1 of the main body portion 111, and the axial line R1, and the angle made by the straight line that passes through the connection position A3 between the frame portion 112 and the other second torsion bar 155 and the center C1 of the main body portion 111, and the axial line R1 may be 0°. Examples of this example include a configuration in which the movable mirror 11 includes a first bracket that protrudes from the frame portion 112 to one side in the X-axis direction along the axial line R1, and a second bracket that protrudes from the frame portion 112 to the other side in the X-axis direction along the axial line R1, and each of the first torsion bars 145 is connected to the first bracket, and each of the second torsion bars 155 is connected to the second bracket.

In the embodiment and the modification examples, materials and shapes of respective configurations are not limited to the above-described materials and shapes, and various materials and shapes can be employed. For example, each of the main body portion 111 and the mirror surface 11a may have any shape such as a rectangular shape and an octagonal shape when viewed from the Z-axis direction. The frame portion 112 may have any ring shape such as a rectangular ring shape and an octagonal ring shape when viewed from the Z-axis direction. In the embodiment, the first torsion support portions are constituted by the plate-shaped first torsion bar 145, but the configuration of the first torsion support portions is not limited to the configuration. The first torsion bars 145 may have any shape such as a rod shape. The first torsion support portions may be constituted by connecting a plurality of (for example, two) torsion bars in series through a connection portion. The configurations are also true of the second torsion bars 155 (second torsion support portions), the third torsion bars 146 (third torsion support portions), and the fourth torsion bars 156 (fourth torsion support portions).

Each of the first rib portion 115b, the second rib portion 112b, and the third rib portion 113b (beam portions) may be formed in any shape. For example, the rib portions may linearly extend or may extend in a zigzag shape. The arrangement, the number, the length, the width, and the thickness of the rib portions may be arbitrarily set. The third rib portion 113b may be omitted, and the thickness of the connection portions 113 in the Z-axis direction may be the same as the thickness of the central portion 114 in the Z-axis direction. In the embodiment, the first rib portion 115b is provided on a surface of the first main body portion 115a on the main surface 12b side, but the first rib portion 115b may be provided on a surface of the first main body portion 115a on the main surface 12a side. This is also true of the second rib portion 112b and the third rib portion 113b.

The brackets 116 may be omitted, and the first torsion bars 145 may be directly connected to the frame portion 112. Similarly, the brackets 117 may be omitted, and the second torsion bars 155 may be directly connected to the frame portion 112. The links 143 and 153 may be omitted. In this case, each of the first optical function unit 17 and the second optical function unit 18 may be constituted by an opening that is formed in the SOI substrate 50. The first optical function unit 17 and the second optical function unit 18 may have any shape such as a circular shape and an octagonal shape when viewed from the Z-axis direction. The movable comb electrodes 162 and 164 may be provided in the movable mirror 11, and may be disposed, for example, along the outer edge of the frame portion 112. The optical device 10 may include a movable unit provided with another optical function unit other than the mirror surface 11a instead of the movable mirror 11. Examples of the other optical function unit include a lens. The actuator unit 16 is not limited to the electrostatic actuator, and may be, for example, a piezoelectric type actuator, an electromagnetic type actuator, or the like. The optical module 1 is not limited to constitute the FTIR, and may constitute another optical system. The optical device 10 may be constituted by a member other than the SOI substrate 50, and may be constituted, for example, by a substrate formed from only silicon.

REFERENCE SIGNS LIST

10: optical device, 11: movable mirror (movable unit), 11a: mirror surface (optical function unit), 12: base, 12a: main surface, 14: first elastic support unit, 15: second elastic support unit, 111: main body portion, 112: frame portion, 112b: second rib portion, 113: connection portion, 113b: third rib portion, 114: central portion, 115: outer edge portion, 115b: first rib portion, 141: lever (first lever), 145: first torsion bar (first torsion bar support portion), 146: third torsion bar (third torsion bar support portion), 151: lever (second lever), 155: second torsion bar (second torsion support portion), 156: fourth torsion bar (fourth torsion support portion).

The invention claimed is:
1. An optical device comprising:
a base that includes a main surface;
a movable unit that includes an optical function unit; and
a first elastic support unit and a second elastic support unit that are connected between the base and the movable unit, and support the movable unit so that the movable unit is movable along a predetermined direction perpendicular to the main surface,
wherein the movable unit includes a main body portion, a frame portion that surrounds the main body portion with a predetermined interval from the main body portion when viewed from the predetermined direction, and a plurality of connection portions which connect the main body portion and the frame portion to each other,
the first elastic support unit includes a pair of first torsion support portions connected to the frame portion,
the second elastic support unit includes a pair of second torsion support portions connected to the frame portion,
the main body portion includes a central portion provided with the optical function unit, and an outer edge portion,
the outer edge portion includes a first main body portion and a first rib portion that is provided on the first main body portion,
the frame portion includes a second main body portion and a second rib portion that is provided on the second main body portion, and
a width of each of the plurality of connection portions is larger than the interval, and is smaller than a distance from a connection position with each of the plurality of connection portions in the frame portion to any of a connection position with each of the pair of first torsion support portions and a connection position with each of the pair of second torsion support portions.

2. The optical device according to claim 1,
wherein in the frame portion, the connection position with each of the plurality of connection portions is located between the connection position with each of the pair of first torsion support portions and the connection position with each of the pair of second torsion support portions.

3. The optical device according to claim 1,
wherein in the frame portion, the connection position with each of the plurality of connection portions is located between the connection positions with the pair of first torsion support portions, or between the connection positions with the pair of second torsion support portions.

4. The optical device according to claim 1,
wherein the plurality of connection portions are disposed in a point symmetry with respect to the center of the main body portion when viewed from the predetermined direction.

5. The optical device according to claim 1,
wherein the width of each of the plurality of connection portions is less than 1/3 times the distance from the connection position with each of the plurality of connection portions in the frame portion to any of the connection position with each of the pair of first torsion support portions and the connection position with each of the pair of second torsion support portions.

6. The optical device according to claim 1,
wherein the width of each of the plurality of connection portions is smaller than a distance from an inner edge of the first rib portion to an outer edge of the frame portion when viewed from the predetermined direction.

7. The optical device according to claim 1,
wherein the main body portion and the optical function unit have a circular shape when viewed from the predetermined direction, and
each of the plurality of connection portions is provided not to intersect a straight line that is perpendicular to a straight line that passes through the center of the connection portion and the center of the main body portion and is in contact with an outer edge of the optical function unit when viewed from the predetermined direction.

8. The optical device according to claim 1,
wherein each of the plurality of connection portions includes a third main body portion and a third rib portion that is provided on the third main body portion, and
the third rib portion is connected to the first rib portion and the second rib portion.

9. The optical device according to claim 2,
wherein each of the pair of first torsion support portions and each of the pair of second torsion support portions extend along a second direction that is perpendicular to the predetermined direction, and
when viewed from the predetermined direction,
any of an angle made by a straight line that passes through a connection position between the frame portion and one of the pair of first torsion support portions and the center of the main body portion, and an axial line that is perpendicular to the second direction and passes through the center of the main body portion,
an angle made by a straight line that passes through a connection position between the frame portion and the other of the pair of first torsion support portions and the center of the main body portion, and the axial line,
an angle made by a straight line that passes through a connection position between the frame portion and one of the pair of second torsion support portions and the center of the main body portion, and the axial line, and
an angle made by a straight line that passes through a connection position between the frame portion and the other of the pair of second torsion support portions and the center of the main body portion, and the axial line is 60° or less.

10. The optical device according to claim 3,
wherein each of the pair of first torsion support portions and each of the pair of second torsion support portions extend along a second direction that is perpendicular to the predetermined direction, and
when viewed from the predetermined direction,
any of an angle made by a straight line that passes through a connection position between the frame portion and one of the pair of first torsion support portions and the center of the main body portion, and an axial line that is perpendicular to the second direction and passes through the center of the main body portion,
an angle made by a straight line that passes through a connection position between the frame portion and the other of the pair of first torsion support portions and the center of the main body portion, and the axial line,
an angle made by a straight line that passes through a connection position between the frame portion and one of the pair of second torsion support portions and the center of the main body portion, and the axial line, and
an angle made by a straight line that passes through a connection position between the frame portion and the other of the pair of second torsion support portions and the center of the main body portion, and the axial line is 30° to 70°.

11. The optical device according to claim 1,
the first elastic support unit further includes a pair of first levers which are respectively connected to the pair of first torsion support portions, and a pair of third torsion support portions which are respectively connected between the pair of first levers and the base, and
the second elastic support unit further includes a pair of second levers which are respectively connected to the pair of second torsion support portions, and a pair of fourth torsion support portions which are respectively connected between the pair of second levers and the base.

12. The optical device according to claim 1,
wherein the thickness of the first rib portion in the predetermined direction is larger than the thickness of the first main body portion in the predetermined direction, and
the thickness of the second rib portion in the predetermined direction is larger than the thickness of the second main body portion in the predetermined direction.

13. The optical device according to claim 1,
wherein the thickness of the first rib portion in the predetermined direction is larger than the thickness of the first main body portion in the predetermined direction.

14. The optical device according to claim 1,
wherein the thickness of the second rib portion in the predetermined direction is larger than the thickness of the second main body portion in the predetermined direction.

15. The optical device according to claim 1,
wherein the base, the movable unit, the first elastic support unit, and the second elastic support unit are formed by a semiconductor substrate including a first silicon layer, a second silicon layer, and an insulating layer disposed between the first silicon layer and the second silicon layer, and
the first main body portion and the second main body portion are formed by the second silicon layer and the first rib portion and the second rib portion are formed by the first silicon layer.

16. The optical device according to claim 1,
wherein the base, the movable unit, the first elastic support unit, and the second elastic support unit are formed by a semiconductor substrate including a first silicon layer, a second silicon layer, and an insulating layer disposed between the first silicon layer and the second silicon layer, and
the first main body portion is formed by the second silicon layer and the first rib portion is formed by the first silicon layer.

17. The optical device according to claim 1,
wherein the base, the movable unit, the first elastic support unit, and the second elastic support unit are formed by a semiconductor substrate including a first silicon layer, a second silicon layer, and an insulating layer disposed between the first silicon layer and the second silicon layer, and
the second main body portion is formed by the second silicon layer and the second rib portion is formed by the first silicon layer.

* * * * *